US012499883B2

(12) United States Patent
Kockerbeck et al.

(10) Patent No.: US 12,499,883 B2
(45) Date of Patent: Dec. 16, 2025

(54) INTERACTIVE CONTENT OUTPUT

(71) Applicant: Amazon Technologies, Inc., Seattle, WA (US)

(72) Inventors: Mark Conrad Kockerbeck, Laguna Beach, CA (US); Srikanth Nori, Arlington, MA (US); Jilani Zeribi, Seattle, WA (US); Ryan Summers, Tustin, CA (US); Volkan Aginlar, Rancho Mission Viejo, CA (US)

(73) Assignee: Amazon Technologies, Inc., Seattle, WA (US)

( * ) Notice: Subject to any disclaimer, the term of this patent is extended or adjusted under 35 U.S.C. 154(b) by 283 days.

(21) Appl. No.: 18/468,788

(22) Filed: Sep. 18, 2023

(65) Prior Publication Data
US 2024/0087562 A1   Mar. 14, 2024

Related U.S. Application Data

(63) Continuation of application No. 17/356,877, filed on Jun. 24, 2021, now Pat. No. 11,810,556.

(51) Int. Cl.
*G10L 15/183* (2013.01)
*G10L 13/08* (2013.01)
*G10L 15/22* (2006.01)

(52) U.S. Cl.
CPC .......... *G10L 15/183* (2013.01); *G10L 13/08* (2013.01); *G10L 15/22* (2013.01); *G10L 2015/223* (2013.01)

(58) Field of Classification Search
USPC .................................................. 704/1–504
See application file for complete search history.

(56) References Cited

U.S. PATENT DOCUMENTS

| | | | |
|---|---|---|---|
| 9,767,794 B2 * | 9/2017 | Vibbert ................ G06F 9/4843 |
| 10,269,351 B2 * | 4/2019 | Aggarwal ............ G10L 15/222 |
| 10,878,047 B1 * | 12/2020 | Mutagi ............... G06F 16/3329 |
| 10,878,438 B2 * | 12/2020 | Chen .................. G06Q 30/0267 |
| 10,896,679 B1 * | 1/2021 | Hu ........................... G10L 15/30 |
| 11,393,456 B1 * | 7/2022 | Guo ..................... G10L 15/1815 |
| 11,551,663 B1 * | 1/2023 | Bissell ..................... G06F 3/167 |
| 11,810,556 B2 * | 11/2023 | Kockerbeck ............ G06F 3/167 |
| 11,887,580 B2 * | 1/2024 | Bissell ................. G06N 3/0442 |
| 12,374,326 B1 * | 7/2025 | Potamianos ........ G10L 15/1815 |
| 2016/0042735 A1 * | 2/2016 | Vibbert ............... G10L 15/1822 |
| | | | 704/257 |

(Continued)

OTHER PUBLICATIONS

International Preliminary Report on Patentability mailed on Jan. 4, 2024, for International Patent Application No. PCT/US2022/032307, filed Jun. 6, 2022.

*Primary Examiner* — Marcus T Riley
(74) *Attorney, Agent, or Firm* — Pierce Atwood LLP

(57) ABSTRACT

Techniques for outputting interactive content and processing interactions with respect to the interactive content are described. While outputting requested content, a system may determine that interactive content is to be outputted. The system may determine output data including a first portion indicating that interactive content is going to be output and a second portion representing content corresponding to an item. The system may send the output data to the device. A user may interact with the output data, for example, by requesting performance of an action with respect to the item.

20 Claims, 11 Drawing Sheets

(56) References Cited

U.S. PATENT DOCUMENTS

| | | | |
|---|---|---|---|
| 2019/0221212 A1* | 7/2019 | Aggarwal | G06F 3/04842 |
| 2021/0173882 A1* | 6/2021 | Mutagi | G06F 16/90332 |
| 2021/0192575 A1* | 6/2021 | Chen | G10L 15/22 |
| 2022/0415307 A1* | 12/2022 | Kockerbeck | G10L 15/183 |
| 2023/0282201 A1* | 9/2023 | Bissell | G10L 13/086 |
| | | | 704/270 |
| 2024/0087562 A1* | 3/2024 | Kockerbeck | G10L 15/22 |

* cited by examiner

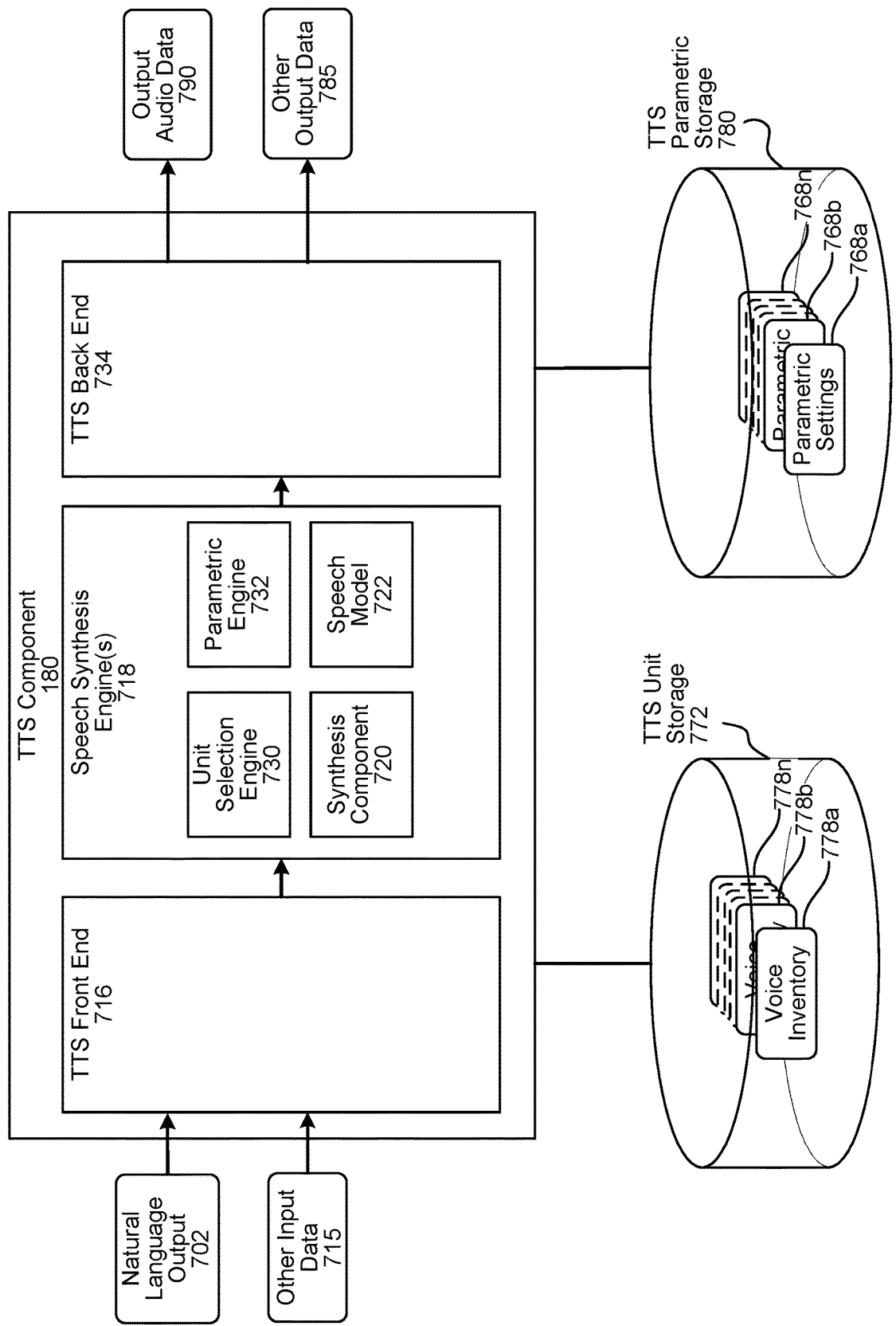

INTERACTIVE CONTENT OUTPUT

CROSS-REFERENCE TO RELATED APPLICATION

This application is a continuation of, and claims the benefit of priority of U.S. Non-Provisional patent application Ser. No. 17/356,877, filed Jun. 24, 2021, and entitled "INTERACTIVE CONTENT OUTPUT," the content of the above application is hereby expressly incorporated by reference in its entirety.

BACKGROUND

Natural language processing systems have progressed to the point where humans can interact with and control computing devices using their voices. Such systems employ techniques to identify the words spoken by a user based on the various qualities of received input data. Speech recognition combined with natural language understanding processing techniques enable speech-based user control of computing devices to perform tasks based on the spoken inputs. Speech recognition and natural language understanding processing techniques are sometimes referred to collectively or separately as spoken language understanding (SLU) processing. SLU processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

FIG. 7A is a conceptual diagram of text-to-speech components, according to embodiments of the present disclosure.

DETAILED DESCRIPTION

Figure 1:
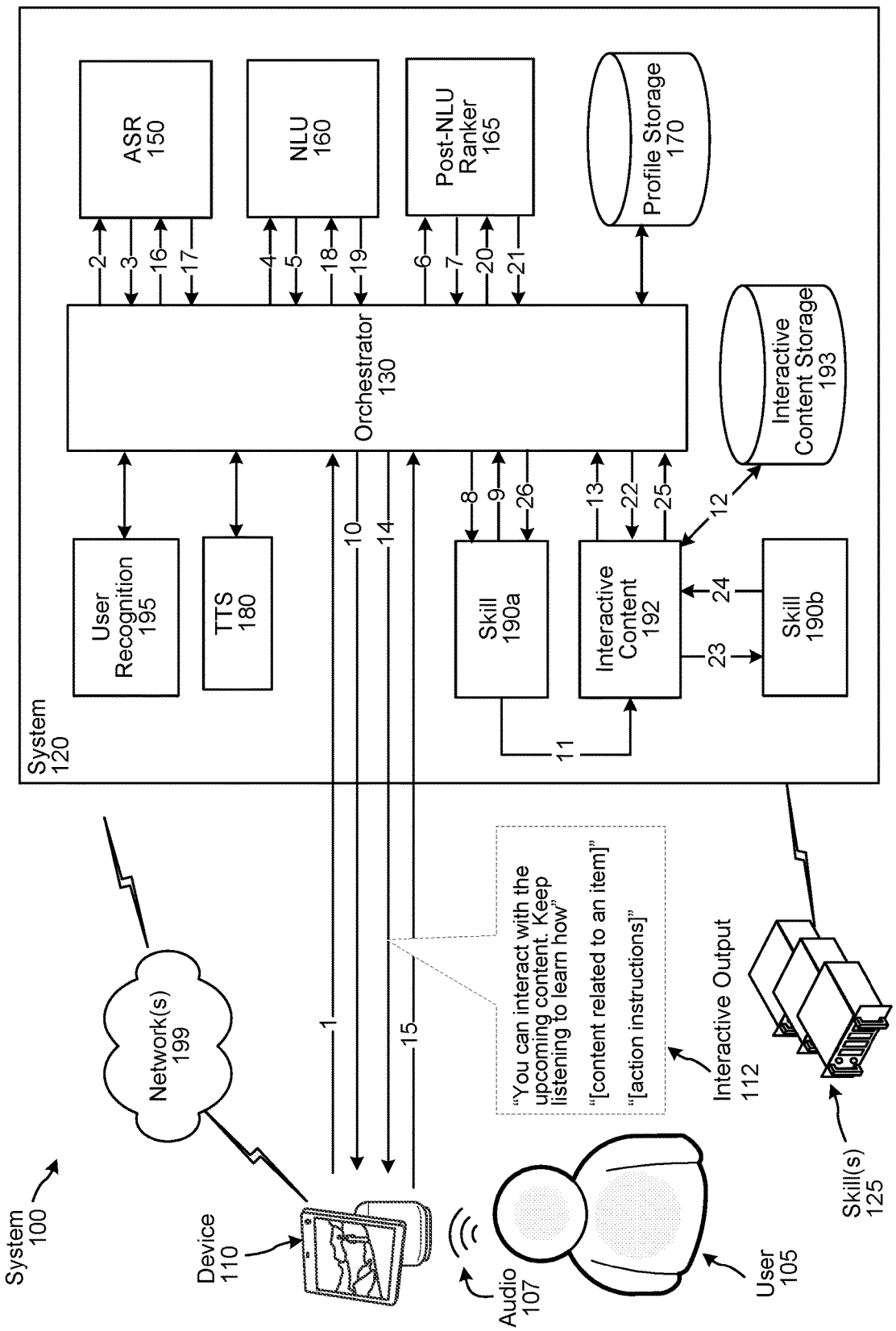
FIG. 1 is a conceptual diagram illustrating an example configuration of a system for outputting interactive content, according to embodiments of the present disclosure.

Automatic speech recognition (ASR) is a field of computer science, artificial intelligence, and linguistics concerned with transforming audio data associated with speech into text representative of that speech. Similarly, natural language understanding (NLU) is a field of computer science, artificial intelligence, and linguistics concerned with enabling computers to derive meaning from text input containing natural language. ASR and NLU are often used together as part of a speech processing system. Text-to-speech (TTS) is a field of concerning transforming textual data into audio data that is synthesized to resemble human speech.

Certain systems may be configured to perform actions responsive to natural language user inputs (e.g., utterances). For example, for the user input of "Alexa, play music by [artist]," a system may output music sung by the indicated artist. For further example, for the user input of "Alexa, what is the weather in [city]," a system may output synthesized speech representing weather information for the indicated city. In a further example, for the user input of "Alexa, play [movie]," a system may play the indicated movie at the device that captured the user input or at another device associated with the user.

In outputting content (such as music, news, radio, podcasts, etc.), the content provider or the system outputting the content may include an opportunity to output certain other content, such as an advertisement, a coupon, information for a purchasable item, etc. Such content may relate to, for example, a product, a service, or other types of items. The present disclosure relates to a system outputting an initial cue before outputting content, where the initial cue indicates to the user the upcoming content is interactive. Additionally, the system also outputs one or more ways the user can interact with the content (e.g., what kind of actions the user can perform, how the user can request performance of the action, etc.). Such content may be referred to herein as content corresponding to an item(s). Such content corresponding to an item(s) (e.g., advertisements, coupons, or other information) may be unresponsive to a user input.

The system of the present disclosure provides techniques for outputting content corresponding to items and enabling the user to interact with such content. From a user experience perspective, the interactive content may be presented to the user as part of an otherwise non-interactive experience (e.g., the output of a song, the output of a podcast, the playing of a radio station, etc.). In some embodiments, the interactive content may include an initial cue portion informing the user that the content (e.g., advertisement) that is about to follow is interactive. Then the content corresponding to the item(s) may be presented to the user, and followed by how the user can further engage with the system regarding the content. The system of the present disclosure may determine interactive content for output including the foregoing portions. For example, the interactive content presented to the user may include the introduction portion: "you can do more with the following ad, keep listening to learn how," followed by an audio clip of an advertisement for a product, and then a prompt indicating what action the user can perform, such as "to add the [product] to your shopping cart, just say "Alexa, add to my cart." In this manner, the system outputs interactive content that enables the user to further engage with the system regarding the interactive content using a rather simple user input.

From a system processing perspective, the system of the present disclosure provides techniques for determining the interactive content, and for processing user inputs related to the interactive content. The system uses context data to determine that a user input relates to the interactive content, and routes the user input to an interactive content component for processing, which may in turn call another processing component to perform any action requested by the user with respect to the interactive content. The system is also configured to hand back control to the initial system (e.g., a skill) that was outputting content (requested by the user) when the interactive content was output, so that it may resume output of requested content. For example, if a music skill was outputting a song to the user when the interactive content was output, the system may (after the interactive content is output or after the user has finished further engaging the system with respect to the interactive content) hand back control to the music skill, resulting in the music skill resuming output of the song.

Teachings of the present disclosure may be configured to incorporate user permissions and may only be performed if approved by a user. As such, the systems, devices, components, and techniques described herein would be typically configured to restrict processing where appropriate and only process user data in a manner that ensures compliance with all appropriate laws, regulations, standards, and the like. The teachings of the present disclosure can be implemented on a geographic basis to ensure compliance with laws in various jurisdictions and entities in which the computing components and/or user are located.

FIG. 1 shows a system 100 configured to output interactive content and process users inputs received with respect to the interactive content, in accordance with example embodiments. As shown in FIG. 1, the system 100 may include a device 110, local to a user 105, and a system 120 connected across one or more networks 199. The network 199 may include the Internet and/or any other wide- or local-area network, and may include wired, wireless, and/or cellular network hardware. Although the figures and discussion of the present disclosure illustrate certain steps in a particular order, the steps described may be performed in a different order (as well as certain steps removed or added) without departing from the present disclosure.

Figure 3:
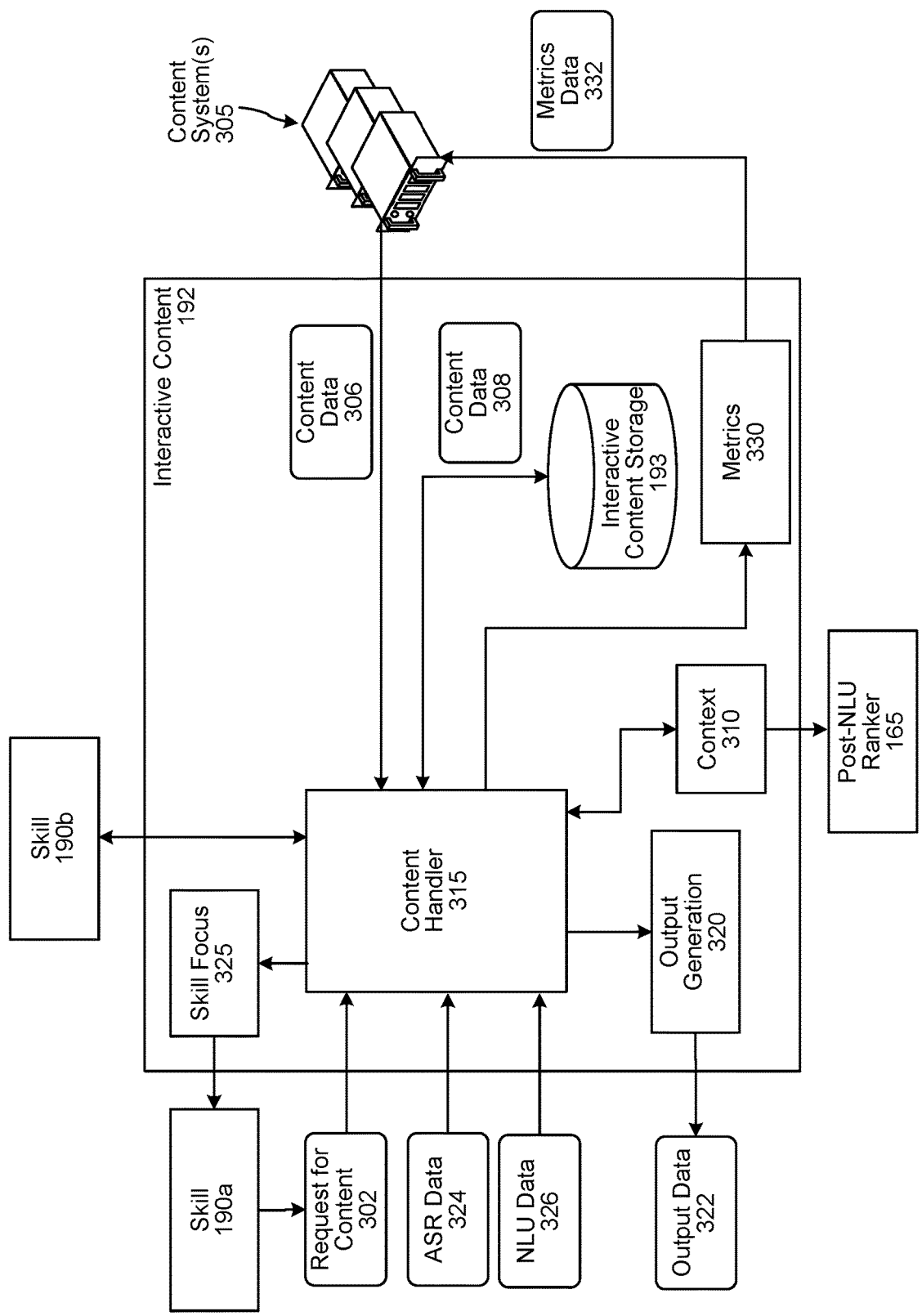
FIG. 3 is a conceptual diagram illustrating example components of an interactive content component, according to embodiments of the present disclosure.

The system 120 may be a speech processing system configured to process spoken natural language inputs (e.g., utterances) using ASR and NLU processing. The system 120 may include multiple components to facilitate speech processing, such as, an orchestrator component 130, an ASR component 150, a NLU component 160, a post-NLU ranker component, and one or more skill components 190. The system 120 may also include an interactive content component 192 and an interactive content storage 193 for outputting interactive content and processing user inputs relating to the interactive content. In some embodiments, the interactive content storage 193 may be part of the interactive content component 192 (as shown in FIG. 3). The system 120 may also include a profile storage 170, a TTS component 180, and a user recognition component 195 to facilitate processing of inputs from the user 105 and generating outputs.

The interactive content component 192 may be configured to output content for an item(s) (e.g., an advertisement for a product or service, information for a product or service, a coupon for a product or service, etc.) while the device 110 is outputting content (e.g., playing music or a movie, displaying a recipe, outputting news, etc.) or performing another type of action requested by the user 105. The output of the interactive content may include an action(s) that the user 105 can request the system 120 to perform with respect to the item(s) included in the outputted interactive content. As described herein, the system 120 may be configured to determine that a user input received, subsequent to the output of the interactive content, corresponds to the interactive content, and accordingly send data relating to the user input to the interactive content component 192 for processing. The interactive content component 192 may invoke a skill component(s) 190 to perform the action(s) requested by the user 105 with respect to the item(s) included in the outputted content. In some embodiments, the interactive content component 192 is implemented as a skill component, and as such, the post-NLU ranker component 165 may consider the interactive content component 192 as a skill component that can potentially respond to a user input.

Referring to FIG. 1, the user 105 may provide an (first) input to the device 110. For example, the user may speak the first input, which the device 110 captures as audio 107. For example, the user 105 may request output of music by saying "Alexa, play music." In other examples, the user 105 may provide another type of input (e.g., selection of a button, selection of displayed graphical interface elements, may perform a gesture, etc.). The device 110 may send (step 1) input data (or such as, audio data, image data, text data, etc.) corresponding to the first user input to the system 120 for processing. In particular, the orchestrator component 130 may receive the input data from the device 110. In the case that the input data is audio data, the orchestrator component 130 may send (step 2) the audio data to the ASR component 150, and the ASR component 150 may process the audio data to determine ASR data (e.g., token data, text data, one or more ASR hypotheses including token or text data and corresponding confidence scores, etc.) corresponding to the words spoken by the user 105. Details on how the ASR component 150 may process the audio data are described below. The ASR component may send (step 3) the ASR data to the orchestrator component 130.

The orchestrator component 130 may send (step 4) the ASR data to the NLU component 160, and the NLU component 160 may process the ASR data to determine NLU data (e.g., intent data, entity data, one or more NLU hypotheses each including an intent and an entity(ies) and a corresponding confidence score, etc.) corresponding to the first user input. Details on how the NLU component 160 may process the ASR data are described below. The NLU component 160 may send (step 5) the NLU data to the orchestrator component 130.

The orchestrator component 130 may send (step 6) the NLU data to the post-NLU ranker component 165, which may be configured to determine which skill component is capable of responding to the first user input based on which skill component is capable of processing the intent data and entity data included in the NLU data. For example, for the user input "Alexa, play music," the post-NLU ranker component 165 may determine a music skill is capable of responding to the first user input. Details on how the post-NLU ranker component 165 may process the NLU data and determine a skill component to execute are described below in relation to FIG. 6. The post-NLU ranker component 165 may send (step 7), to the orchestrator component 130, a skill identifier identifying the skill component 190a that is to be used to respond to the first user input.

Based on receiving the skill identifier from the post-NLU ranker component 165, the orchestrator component 130 may invoke (step 8) the skill component 190a associated with the skill identifier. In invoking the skill component 190a, the orchestrator component 130 may send a command to the skill component 190a to perform an action corresponding to a NLU hypothesis (included in the NLU data) associated with the skill component 190a. The orchestrator component 130 may also send, to the skill component 190a, data corresponding to the first user input, such as, the ASR data corresponding to the first user input, the NLU data corresponding to the first user input, information corresponding to the device 110 (e.g., device type, device location, device capabilities, etc.), the time when the first user input is received by the system 120, user profile data (from the profile storage 170) associated with the user 105, and/or other data. In some embodiments, the orchestrator component 130 may send the data corresponding to the first user input in response to the skill component 190a requesting such data.

The skill component 190a may process the NLU hypothesis and other data corresponding to the first user input, and may determine output data responsive to the first user input. For example, for the user input "Alexa, play music," the output data determined by the skill component 190a (which may be a music skill component) may be audio data corresponding to music. The skill component 190a may send (step 9) the output data to the orchestrator component 130 for output in response to the first user input, and the orchestrator component 130 may send (step 10) the output data to the device 110, which is configured to output content corresponding to the output data (e.g., audio of music corresponding to output audio data).

The skill component 190a may determine that content corresponding to an item(s) (e.g., an advertisement for an item(s) or information for an item(s)) is to be outputted while the device 110 is outputting the content corresponding to the output data responsive to the first user input.

Such content may be provided by another system, and may be unrelated to the output data responsive to the first user input. For example, the content may be related to the output data responsive to the first user input may corresponding to a first entity, and the content corresponding to the item corresponds to a second entity. In some embodiments, the output data responsive to the first user input may include a time marker that may indicate a time when content corresponding to an item(s) can be outputted. A time marker, for example, may indicate a time elapsed since the output data starts (e.g., after 5 minutes). As another example, if the output data is music, the time marker may be an end of a track, a song, an album, etc. In response to determining that content corresponding to an item(s) is to be outputted, the skill component 190a may send (step 11) a request, to the interactive content component 192, for output of such content. During playback/output of the output data, when the skill component 190a is about to reach the time marker, the skill component 190a may send the request to the interactive content component 192.

In response to the request from the skill component 190a, the interactive content component 192 may retrieve (step 12) content from the interactive content storage 193 for output. The content retrieved from the interactive content storage 193 may be audio data or video data representing information for an item(s) (e.g., an advertisement for a product or service). The interactive content component 192 may also retrieve one or more actions that the user 105 can perform with respect to the item(s) represented in the content.

The interactive content component 192 may determine interactive output data using the content and the action(s). In example embodiments, the interactive content component 192 may determine the output data to include three portions—a first portion may be a cue or indication to the user 105 that the content being output is interactive; a second portion may be the content for the item(s); and a third portion may include an action(s) that the user 105 can perform with respect to the item. An example interactive output 112 is illustrated in FIG. 1, where the first portion is "You can interact with the upcoming content. Keep listening to learn how," the second portion being the content related to the item, and the third portion providing some action instructions for the action that can be performed with respect to the item. Portions of the output data may be audio data representing synthesized speech, while other portions of the output data may be pre-recorded audio data or pre-recorded video data. In a non-limiting example, if the content represents information for a product, and the action the user 105 can perform is to add the product to an electronic shopping cart, then the interactive content component 192 may determine the first portion of the output data to be audio data representing the synthesized speech "you can do more with the following content. Keep listening to learn how." The second portion, in this example, may be video data showing information for the product, and the third portion may be audio data corresponding to the synthesized speech "if you want to add the product to your cart, just say 'yes please.'" Details on how the interactive content component 192 may determine the output data are described below in relation to FIG. 5.

The interactive content component 192 may send (step 13) the output data to the orchestrator component 130 for output, and the orchestrator component 130 may send (step 14) the output data to the device 110 for output. FIG. 1 shows the example interactive output 112 that may be presented to the user 105. As part of sending the output data to the orchestrator component 130, the interactive content component 192 may also perform other steps to enable processing of any user inputs interacting with the content corresponding to the item(s). Details of these steps are described below in relation to FIG. 3. For example, the interactive content component 192 may generate context data indicating that interactive content is being outputted at the device 110, and may send (or otherwise make available) the context data to the post-NLU ranker component 165. The interactive content component 192 may, additionally, store focus data indicating that the skill component 190a was active (i.e. outputting output data in response to the first user input). Using the focus data, the interactive content component 192 may send an indication/command to the skill component 190a to resume its session, as described below, after the interaction with the interactive content is completed.

In some cases, the user 105 may provide a second user input after the output data from the interactive content component 192 is outputted. The device 110 may send (step 15) second input data corresponding to the second user input to the system 120. The second user input may take various forms (e.g., an utterance, selection of a button on the device 110, selection of a graphical interface element displayed at the device 110, performing of a gesture, etc.), and the input data may take a corresponding form (e.g., audio data, image data, text data, etc.).

In the case that the second user input is a spoken input, the orchestrator component 130 may send (step 16) the audio data (a form of input data) corresponding to the second user input to the ASR component 150, and the ASR component 150 may process the audio data (as described in detail below) to determine ASR data (e.g., token data, text data, one or more ASR hypotheses including token or text data and corresponding confidence scores, etc.) representing the words spoken by the user 105. The ASR component 150 may send (step 17) the ASR data to the orchestrator component 130.

The orchestrator component 130 may send (step 18) the ASR data to the NLU component 160, and the NLU component 160 may process the ASR data (as described in detail below) to determine NLU data (e.g., intent data, entity data, one or more NLU hypotheses each including an intent and an entity(ies) and a corresponding confidence score, etc.) corresponding to the second user input. The NLU component 160 may send (step 19) the NLU data to the orchestrator component 130.

The orchestrator component 130 may send (step 20) the NLU data to the post-NLU ranker component 165 to determine which skill component is capable of responding to the second user input. In this case, the post-NLU ranker component 165 may use context data (such as the context data generated by the interactive content component 192) to determine that the device 110 recently (e.g., within a particular time period) outputted interactive content provided by the interactive content component 192. Based on this determination, the post-NLU ranker component 165 may determine that the interactive content component 192 is capable of responding to the second user input, and may send (step 21), to the orchestrator component 130, an identifier identifying the interactive content component 192.

Based on receiving the identifier for the interactive content component 192, the orchestrator component 130 may invoke (step 22) the interactive content component 192, and may also send the ASR data and the NLU data corresponding to the second user input to the interactive content component 192. Using the ASR data, the NLU data and the action information (retrieved in the step 12), the interactive content component 192 may determine that the user 105 wants to perform the action with respect to the item(s). The interactive content component 192 may determine that a skill component 190b may be capable of performing the action with respect to the item(s), and may send (step 23) a command to the skill component 190b to perform the action. The command may include an indication of the action and an indication of the item(s). For example, if the action is to add the item(s) to an electronic shopping cart for the user 105, and the second user input is "yes," then the interactive content component 192 may send a command to the skill component 190b (which may be a shopping skill) to add the item(s) to the electronic shopping cart for the user 105. Even though the second user input is merely "yes" and does not include various information needed to by the skill component 190b to perform the action, the interactive content component 192 includes the relevant information, such as, entity data identifying the item(s) of the content and intent data corresponding to the action to be performed, in the command to the skill component 190b. The interactive content component 192, thus, facilitates performance of the action with respect to the item(s) represented in the content, without the user 105 needing to provide an input inclusive of all the information needed by the skill component 190n to perform the action. That is, for example, the user 105 may just say "yes" for the second user input, instead of saying "add the item(s) to my shopping cart."

In some embodiments, the skill component 190b may use user profile data, associated with the user 105 in the profile storage 170, to determine other information needed to perform the action (e.g., identifying the electronic shopping cart for the user 105). The skill component 190b may also request other data needed to perform the action from the orchestrator component 130 or the interactive content component 192. In alternative embodiments, the interactive content component 192 may store data identifying which types of data are needed by the skill component 190b to perform the action, may retrieve that data (e.g., from the profile storage 170), and may send that data to the skill component 190b along with the command to perform the action with respect to the item(s).

The skill component 190b may send (step 24), to the interactive content component 192, an indication that the requested action has been completed. In some embodiments, the skill component 190b (or the interactive content component 192 or another component of the system 120) may send output data (e.g., audio data representing synthesized speech and/or image data for display) to the device 110, via the orchestrator component 130, indicating that the action was performed (e.g., the item has been added to the electronic shopping cart for the user 105). In other embodiments, the skill component 190b (or the interactive content component 192 or another component of the system 120) may send a message (e.g., an email, an SMS, a notification, etc.) to the device 110 or another device 110 of the user 105 indicating that the action was performed.

In response to receiving the indication (that the action is completed) from the skill component 190b, the interactive content component 192 may send (step 25) an indication, to the orchestrator component 130, that the interaction related to the interactive content is complete, and that the skill component 190a may resume its session. Based on receiving the indication, the orchestrator component 130 may send (step 26) a command to the skill component 190a to resume its session (e.g., continue to output music, such as, the next track, album, etc.). In other embodiments, the interactive content component 192 may send the indication (of step 25) directly to the skill component 190a to signal the skill component 190a to resume its session (e.g., continue to output music, such as, the next track, album, etc.).

In the case that the second user input (received at step 15) does not request performance of the action, that is the second user input is "no," then the interactive content component 192 may determine, using the ASR data and the NLU data corresponding to the second user input received at the step 22 that the user 105 does not want the action indicated in the interactive content to be performed. In this case, the interactive content component 192 may not invoke (at the step 23) the skill component 190b, and may instead send an indication to the orchestrator component 130 or directly to the skill component 190a to resume the skill component 190a session (e.g., continue to output music, such as, the next track, album, etc.).

In some cases, the user 105 may provide the second user input after some time has elapsed since the interactive content is outputted. For example, the user 105 may say "yes" or "add the item(s) to my shopping cart" after a period of time (e.g., 1 minute, 5 minutes, 1 hour, etc.) since the interactive content (e.g., an advertisement for the item(s)) was outputted at the device 110. In this case, the post-NLU ranker component 165 may determine that the second user input corresponds to the skill component 190a, which may be currently active, or that the second user input corresponds to another skill component 190c, but does not correspond to the interactive content component 192. Based on the information included in the second user input, the system 120 or the selected skill component 190a or 190c may request the user 105 to provide additional information so that an output responsive to the second user input may be determined. For example, if the user 105 merely says "yes" then the system 120 or the skill component 190a or 190c may send audio data, to the device 110, including synthesized speech requesting more information, or may send audio data, to the device 110, including synthesized speech indicating the system 120 cannot respond to the user input (e.g., "sorry, I don't understand").

In some embodiments, if the interactive content component 192 does not receive, from the orchestrator component 130, data corresponding to a user input, such as ASR data or NLU data for the user input, within a particular time since the interactive content is sent to the device 110 (in the step 14), then the interactive content component 192 may send an indication to the orchestrator component 130 or directly to the skill component 190a to resume the skill component 190a session (e.g., continue to output music, such as, the next track, album, etc.). For example, if the device 110 outputs the interactive content at a first time, and by a second time (e.g., after 5 seconds, 1 minute, 5 minutes, 1 hour, etc. of the first time) the interactive content component 192 has not received data corresponding to a user input, then the interactive content component 192 may transfer control back to the skill component 190a.

In some cases, the second user input may be other than a simple "yes" or "no" indicating whether or not the action represented in the interactive content should be performed. For example, the second user input may be "play next song." In such cases, the post-NLU ranker component 165 may determine that the interactive content component 192 is not the best component to respond to the second user input, even though the context data indicates that the interactive content was recently outputted at the device 110 and the second user input was received shortly after or immediately after the interactive content was outputted. In such cases, the post-NLU ranker component 165 may determine, using the NLU data, that a music skill, which may be the skill component 190a, is the appropriate skill for responding to the second user input, and may send an instruction to the music skill to respond to the second user input.

In this manner, the system 120 may output interactive content at the device 110, and process a user input received in response to the interactive content. The interactive content may present an action that can be performed with respect to an item(s) represented in the content, a user may simply respond "yes" or provide a shortened input to request performance of the action, and the system 120 may invoke the appropriate skill components and send the data needed for performing the action.

Other non-limiting examples of items that may be presented in the interactive content and actions that can be performed are as follows. In one example, the content may describe a movie or a show, and the user 105 may be able to watch the trailer. The third portion of the interactive output, in this example, may be audio data corresponding to the synthesized speech "if you want to watch the trailer just say 'yes.'" In another example, the content may describe a product, and the user 105 may be able to order a sample. The third portion of the interactive output, in this example, may be audio data corresponding to the synthesized speech "do you want to receive a sample?'" In yet another example, the content may describe a service (e.g., a home cleaning service, a car repair service, etc.), and the user 105 may be able to receive more information. The third portion of the interactive output, in this example, may be audio data corresponding to the synthesized speech "say yes if you want an email with more information." In yet another example, the content may describe a product, and the user 105 may be able to receive a coupon for the product. The third portion of the interactive output, in this example, may be audio data corresponding to the synthesized speech "just say 'Alexa clip the coupon' if you want the coupon.'" In another example, the content may describe an upcoming show, and the user 105 may be able to set a reminder. The third portion of the interactive output, in this example, may be audio data corresponding to the synthesized speech "do you want to set a reminder for the show?"

In some embodiments, the interactive content may include options for two or more actions that can be performed with respect to the item(s) included in the content. For example, the user 105 may able to add an item to an electronic shopping cart or may be to receive a sample of the item. In this example, the third portion of the interactive output may be audio data corresponding to the synthesized speech "if you want to add to your cart, say 'Alexa, add to cart' or if you want to receive a sample say 'Alexa, send me a sample.'" Based on the user input, the interactive content component 192 may invoke the appropriate skill component to perform the requested action.

In some embodiments, the content describing an item may be presented when the device 110 is in a screen-saving mode. In the case that the device 110 has a display screen, such device 110 may enter a screen-saving mode when the user 105 is not interacting with the device 110. During the screen-saving mode, the device 110 may display one or more content (e.g., supplemental content) that is not in response to a user input. Such content may provide information on skills that the user 105 can use, new music or new items available at a skill, new functionalities available at a skill, a recommended action the user 105 may want to request, etc. The content describing an item may be presented as supplemental content during the screen-saving mode. In some embodiments, the content describing an item may be an image, and before displaying the image, the device 110 may output audio data representing synthesized speech "You can interact with the upcoming content. Stay tuned to learn how." Alternatively, the device 110 may display text of the same, thus, indicating to the user 105 that the content that is about to be outputted is interactive. In some embodiments, the content describing the item (e.g., the image) may include an action(s) that the user 105 can perform with respect to the item. For example, the image may include the following text "To clip the coupon, just say Alexa Clip Coupon." Alternatively, the device 110 may output audio data representing synthesized speech of the same, thus, indicating to the user 105 an action(s) the user can perform. The synthesized speech may be outputted while the content describing the item (e.g., the image) is being displayed at the device 110. The user 105 may provide a spoken input requesting performance of the indicated action. In other embodiments, the user 105 may provide a touch screen input requesting performance of the indicated action. In such embodiments, the action that the user 105 can perform may be displayed at the device 110, for example, the device 110 may display the image corresponding to the content describing the item along with the following text "Touch this button to add the item to your cart." In response to receiving a request to perform the indicated action, the system 120 may perform some of the functionalities described above to execute the action, during which the device 110 may display information indicating the action has been performed. Once the action is performed, the device 110 may return to the screen-saving mode and may display the next supplemental content in queue.

The system 120 may use other components illustrated in FIG. 1. The various components shown in FIG. 1 may be located on a same or different physical devices. Communication between various components may occur directly or across the network(s) 199.

A microphone or array of microphones (of or otherwise associated with the device 110) may capture audio. The device 110 processes audio data, representing the audio, to determine whether speech is detected. The device 110 may use various techniques to determine whether audio data includes speech. In some examples, the device 110 may apply voice activity detection (VAD) techniques. Such techniques may determine whether speech is present in audio data based on various quantitative aspects of the audio data, such as the spectral slope between one or more frames of the audio data, the energy levels of the audio data in one or more spectral bands, the signal-to-noise ratios of the audio data in one or more spectral bands, or other quantitative aspects. In other examples, the device 110 may implement a classifier configured to distinguish speech from background noise. The classifier may be implemented by techniques such as linear classifiers, support vector machines, and decision trees. In still other examples, the device 110 may apply Hidden Markov Model (HMM) or Gaussian Mixture Model (GMM) techniques to compare the audio data to one or more acoustic models in storage, which acoustic models may include models corresponding to speech, noise (e.g., environmental noise or background noise), or silence. Still other techniques may be used to determine whether speech is present in audio data.

Once speech is detected in audio data, the device 110 may determine if the speech is directed at the device 110/system 120. In at least some embodiments, such determination may be made using a wakeword detection component 220 (shown in FIG. 2). The wakeword detection component 220 may be configured to detect various wakewords. In at least some examples, each wakeword may correspond to a name of a different digital assistant. An example wakeword/digital assistant name is "Alexa."

Wakeword detection is typically performed without performing linguistic analysis, textual analysis, or semantic analysis. Instead, the audio data is analyzed to determine if specific characteristics of the audio data match preconfigured acoustic waveforms, audio signatures, or other data corresponding to a wakeword.

Thus, the wakeword detection component 220 may compare audio data to stored data to detect a wakeword. One approach for wakeword detection applies general large vocabulary continuous speech recognition (LVCSR) systems to decode audio signals, with wakeword searching being conducted in the resulting lattices or confusion networks. Another approach for wakeword detection builds HMMs for each wakeword and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid deep neural network (DNN)-HMM decoding framework. In another example, the wakeword detection component 220 may be built on DNN/recursive neural network (RNN) structures directly, without HMM being involved. Such an architecture may estimate the posteriors of wakewords with context data, either by stacking frames within a context window for DNN, or using RNN. Follow-on posterior threshold tuning or smoothing is applied for decision making. Other techniques for wakeword detection, such as those known in the art, may also be used.

Once the wakeword detection component 220 detects a wakeword, the device 110 may "wake" and begin transmitting audio data 211, representing the audio, to the system 120. The audio data 211 may include the detected wakeword, or the device 110 may remove the portion of the audio data, corresponding to the detected wakeword, prior to sending the audio data 211 to the system 120.

In some embodiments, in providing the second user input (at the step 15 shown in FIG. 1), the user 105 may not need to say a wakeword for the device 110 to transmit audio data corresponding to the second user input. The system 120 may, with user permission, open the microphone(s) of the device 110, after the interactive content has been outputted by the device 110, for a period of time (e.g., 30 seconds) to capture any spoken inputs responsive to the interactive content. In other embodiments, the user 105 may have to include a wakeword in the second user input for the device 110 to transmit audio data corresponding to the second user input. For example, the user 105 may have to say "Alexa, yes" or "Alexa, clip the coupon" to cause the system 120 to perform the action included in the interactive content.

The orchestrator component 130 may be configured to, among other things, coordinate data transmissions between components of the system 120. The orchestrator component 130 may receive the audio data 211 from the device 110, and send the audio data 211 to the ASR component 150.

The ASR component 150 transcribes the audio data 211 into ASR output data including one or more ASR hypotheses. An ASR hypothesis may be configured as a textual interpretation of the speech in the audio data 211, or may be configured in another manner, such as one or more tokens. Each ASR hypothesis may represent a different likely interpretation of the speech in the audio data 211. Each ASR hypothesis may be associated with a score (e.g., confidence score, probability score, or the like) representing the associated ASR hypothesis correctly represents the speech in the audio data 211.

The ASR component 150 interprets the speech in the audio data 211 based on a similarity between the audio data 211 and pre-established language models. For example, the ASR component 150 may compare the audio data 211 with models for sounds (e.g., subword units, such as phonemes, etc.) and sequences of sounds to identify words that match the sequence of sounds of the speech represented in the audio data 211.

In at least some instances, instead of the device 110 receiving a spoken natural language input, the device 110 may receive a textual (e.g., types) natural language input. The device 110 may determine text data representing the textual natural language input, and may send the text data to the system 120, wherein the text data is received by the orchestrator component 130. The orchestrator component 130 may send the text data or ASR output data, depending on the type of natural language input received, to the NLU component 160.

The NLU component 160 processes the ASR output data or text data to determine one or more NLU hypotheses embodied in NLU output data. The NLU component 160 may perform intent classification (IC) processing on the ASR output data or text data to determine an intent of the natural language input. An intent corresponds to an action to be performed that is responsive to the natural language input. To perform IC processing, the NLU component 160 may communicate with a database of words linked to intents. For example, a music intent database may link words and phrases such as "quiet," "volume off," and "mute" to a <Mute> intent. The NLU component 160 identifies intents by comparing words and phrases in ASR output data or text data to the words and phrases in an intents database. In some embodiments, the NLU component 160 may communicate with multiple intents databases, with each intents database corresponding to one or more intents associated with a particular skill.

For example, IC processing of the natural language input "play my workout playlist" may determine an intent of <PlayMusic>. For further example, IC processing of the natural language input "call mom" may determine an intent of <Call>. In another example, IC processing of the natural language input "call mom using video" may determine an intent of <VideoCall>. In yet another example, IC processing of the natural language input "what is today's weather" may determine an intent of <OutputWeather>.

The NLU component 160 may also perform named entity recognition (NER) processing on the ASR output data or text data to determine one or more portions, sometimes referred to as slots, of the natural language input that may be needed for post-NLU processing (e.g., processing performed by a skill). For example, NER processing of the natural language input "play [song name]" may determine an entity type of "SongName" and an entity value corresponding to the indicated song name. For further example, NER processing of the natural language input "call mom" may determine an entity type of "Recipient" and an entity value corresponding to "mom." In another example, NER processing of the natural language input "what is today's weather" may determine an entity type of "Date" and an entity value of "today."

In at least some embodiments, the intents identifiable by the NLU component 160 may be linked to one or more grammar frameworks with entity types to be populated with entity values. Each entity type of a grammar framework corresponds to a portion of ASR output data or text data that the NLU component 160 believes corresponds to an entity value. For example, a grammar framework corresponding to a <PlayMusic> intent may correspond to sentence structures such as "Play {Artist Name}," "Play {Album Name}," "Play {Song name}," "Play {Song name} by {Artist Name}," etc.

For example, the NLU component 160 may perform NER processing to identify words in ASR output data or text data as subject, object, verb, preposition, etc. based on grammar rules and/or models. Then, the NLU component 160 may perform IC processing using the identified verb to identify an intent. Thereafter, the NLU component 160 may again perform NER processing to determine a grammar model associated with the identified intent. For example, a grammar model for a <PlayMusic> intent may specify a list of entity types applicable to play the identified "object" and any object modifier (e.g., a prepositional phrase), such as {Artist Name}, {Album Name}, {Song name}, etc. The NER processing may then involve searching corresponding fields in a lexicon, attempting to match words and phrases in the ASR output data that NER processing previously tagged as a grammatical object or object modifier with those identified in the lexicon.

NER processing may include semantic tagging, which is the labeling of a word or combination of words according to their type/semantic meaning. NER processing may include parsing ASR output data or text data using heuristic grammar rules, or a model may be constructed using techniques such as hidden Markov models, maximum entropy models, log linear models, conditional random fields (CRFs), and the like. For example, NER processing with respect to a music skill may include parsing and tagging ASR output data or text data corresponding to "play mother's little helper by the rolling stones" as {Verb}: "Play," {Object}: "mother's little helper," {Object Preposition}: "by," and {Object Modifier}: "the rolling stones." The NER processing may identify "Play" as a verb based on a word database associated with the music skill, which IC processing determines corresponds to a <PlayMusic> intent.

The NLU component 160 may generate NLU output data including one or more NLU hypotheses, with each NLU hypothesis including an intent and optionally one or more entity types and corresponding entity values. In some embodiments, the NLU component 160 may perform IC processing and NER processing with respect to different skills. One skill may support the same or different intents than another skill. Thus, the NLU output data may include multiple NLU hypotheses, with each NLU hypothesis corresponding to IC processing and NER processing performed on the ASR output or text data with respect to a different skill.

As described above, the system 120 may perform speech processing using two different components (e.g., the ASR component 150 and the NLU component 160). In at least some embodiments, the system 120 may implement a spoken language understanding (SLU) component configured to process audio data 211 to determine NLU output data.

The SLU component may be equivalent to a combination of the ASR component 150 and the NLU component 160. Yet, the SLU component may process audio data 211 and directly determine the NLU output data, without an intermediate step of generating ASR output data. As such, the SLU component may take audio data 211 representing a spoken natural language input and attempt to make a semantic interpretation of the spoken natural language input. That is, the SLU component may determine a meaning associated with the spoken natural language input and then implement that meaning. For example, the SLU component may interpret audio data 211 representing a spoken natural language input in order to derive a desired action. The SLU component may output a most likely NLU hypothesis, or multiple NLU hypotheses associated with respective confidence or other scores (such as probability scores, etc.).

As used herein, a "domain" may refer to a collection of related functionality. A domain may be associated with one or more skills performing related functionality may be part of a domain. A non-limiting list of domains includes a smart home domain (corresponding to smart home functionality), a music domain (corresponding to music functionality), a video domain (corresponding to video functionality), a weather domain (corresponding to weather functionality), a communications domain (corresponding to one- or two-way communications functionality), and a shopping domain (corresponding to shopping functionality).

As used herein, a "skill" may refer to software, that may be placed on a machine or a virtual machine (e.g., software that may be launched in a virtual instance when called), configured to process natural language understanding (NLU) output data (e.g., including an intent and optionally one or more entities) and perform one or more actions in response thereto. What is referred to herein as a skill may sometimes be referred to as an application, bot, action, or the like. A group of skills of related functionality may be associated with a domain. For example, a first music skill and a second music skill may be associated with a music domain.

The system 120 may include one or more skill components 190 and/or may communicate with one or more skills 125. A "skill" may refer to software, that may be placed on a machine or a virtual machine (e.g., software that may be launched in a virtual instance when called), configured to process NLU output data and perform one or more actions in response thereto. For example, for NLU output data including a <PlayMusic> intent, an "artist" entity type, and an artist name as an entity value, a music skill may be called to output music sung by the indicated artist. For further example, for NLU output data including a <TurnOn> intent, a "device" entity type, and an entity value of "lights," a smart home skill may be called to cause one or more "smart" lights to operate in an "on" state. In another example, for NLU output data including an <OutputWeather> intent, a "location" entity type, and an entity value corresponding to a geographic location of the device 110, a weather skill may be called to output weather information for the geographic location. For further example, for NLU output data including a <BookRide> intent, a taxi skill may be called to book a requested ride. In another example, for NLU output data including a <BuyPizza> intent, a restaurant skill may be called to place an order for a pizza.

A skill component 190 may operate in conjunction between the system 120 and other devices, such as the device 110, a restaurant electronic ordering system, a taxi electronic booking system, etc. in order to complete certain functions. Inputs to a skill component 190 may come from speech processing interactions or through other interactions or input sources.

A skill component 190 may be associated with a domain, a non-limiting list of which includes a smart home domain, a music domain, a video domain, a weather domain, a communications domain, a flash briefing domain, a shopping domain, and a custom domain.

The system 120 may include a TTS component 180 that generates audio data including synthesized speech. The data input to the TTS component 180 may come from a skill component 190 or the skill 125, the orchestrator component 130, or another component of the system 120.

Details of the TTS component may process are described below in relation to FIGS. 7A and 7B. In one method of synthesis called unit selection, the TTS component 180 matches input data against a database of recorded speech. The TTS component 180 selects matching units of recorded speech and concatenates the units together to form audio data. In another method of synthesis called parametric synthesis, the TTS component 180 varies parameters such as frequency, volume, and noise to determine audio data including an artificial speech waveform. Parametric synthesis uses a computerized voice generator, sometimes called a vocoder.

The system 120 may include a user recognition component 195. The user recognition component 195 may recognize one or more users using various data. The user recognition component 195 may take as input the audio data 211. The user recognition component 195 may perform user recognition by comparing speech characteristics, in the audio data 211, to stored speech characteristics of users. The user recognition component 195 may additionally or alternatively perform user recognition by comparing biometric data (e.g., fingerprint data, iris data, retina data, etc.), received by the system 120 in correlation with a natural language input, to stored biometric data of users. The user recognition component 195 may additionally or alternatively perform user recognition by comparing image data (e.g., including a representation of at least a feature of a user), received by the system 120 in correlation with a natural language input, with stored image data including representations of features of different users. The user recognition component 195 may perform other or additional user recognition processes, including those known in the art. For a particular natural language input, the user recognition component 195 may perform processing with respect to stored data of users associated with the device 110 that received the natural language input.

The user recognition component 195 determines whether a natural language input originated from a particular user. For example, the user recognition component 195 may determine a first value representing a likelihood that a natural language input originated from a first user, a second value representing a likelihood that the natural language input originated from a second user, etc. The user recognition component 195 may also determine an overall confidence regarding the accuracy of user recognition processing.

The user recognition component 195 may output a single user identifier corresponding to the most likely user that originated the natural language input. Alternatively, the user recognition component 195 may output multiple user identifiers (e.g., in the form of an N-best list) with respective values representing likelihoods of respective users originating the natural language input. The output of the user recognition component 195 may be used to inform NLU processing, processing performed by a skill 125, as well as processing performed by other components of the system 120 and/or other systems.

The system 120 may include profile storage 170. The profile storage 170 may include a variety of data related to individual users, groups of users, devices, etc. that interact with the system 120. As used herein, a "profile" refers to a set of data associated with a user, group of users, device, etc. The data of a profile may include preferences specific to the user, group of users, device, etc.; input and output capabilities of one or more devices; internet connectivity data; user bibliographic data; subscription data; skill enablement data; and/or other data.

The profile storage 170 may include one or more user profiles. Each user profile may be associated with a different user identifier. Each user profile may include various user identifying data (e.g., name, gender, address, language(s), etc.). Each user profile may also include preferences of the user. Each user profile may include one or more device identifiers, each representing a respective device registered to the user. Each user profile may include skill identifiers of skills 125 that the user has enabled. When a user enables a skill 125, the user is providing the system 120 with permission to allow the skill 125 to execute with respect to the user's natural language inputs. If a user does not enable a skill 125, the system 120 may not execute the skill 125 with respect to the user's natural language inputs.

The profile storage 170 may include one or more group profiles. Each group profile may be associated with a different group identifier. A group profile may be specific to a group of users. That is, a group profile may be associated with two or more individual user profiles. For example, a group profile may be a household profile that is associated with user profiles associated with multiple users of a single household. A group profile may include preferences shared by all the user profiles associated therewith. Each user profile associated with a group profile may additionally include preferences specific to the user associated therewith. That is, a user profile may include preferences unique from one or more other user profiles associated with the same group profile. A user profile may be a stand-alone profile or may be associated with a group profile. A group profile may be associated with (or include) one or more device profiles corresponding to one or more devices associated with the group profile.

The profile storage 170 may include one or more device profiles. Each device profile may be associated with a different device identifier. A device profile may include various device identifying data, input/output characteristics, networking characteristics, etc. A device profile may also include one or more user identifiers, corresponding to one or more user profiles associated with the device profile. For example, a household device's profile may include the user identifiers of users of the household.

Figure 2:
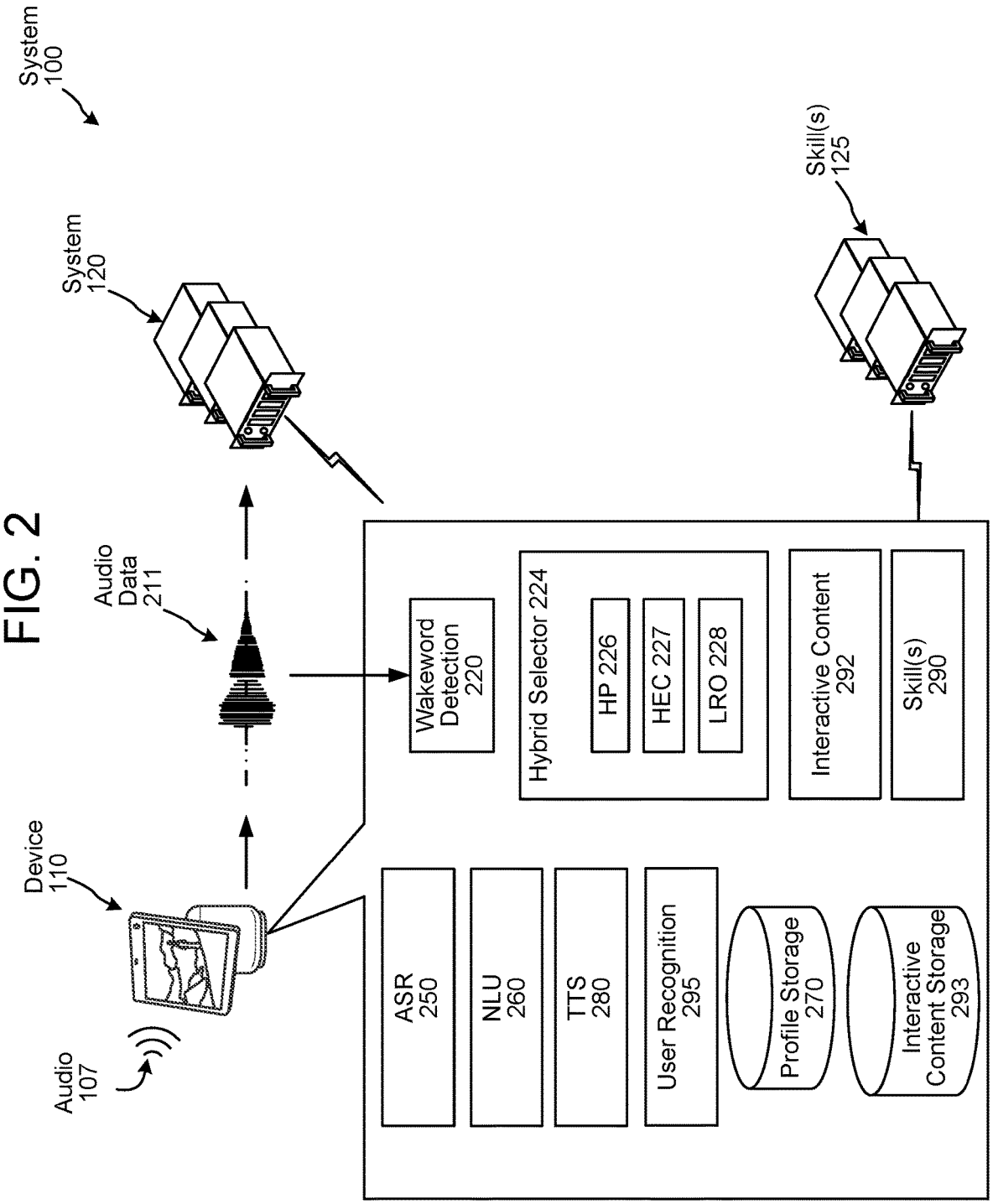
FIG. 2 is a conceptual diagram illustrating components that may be included in a device, according to embodiments of the present disclosure.

The foregoing describes illustrative components and processing of the system 120. The following describes illustrative components and processing of the device 110. As illustrated in FIG. 2, in at least some embodiments the system 120 may receive the audio data 211 from the device 110, to recognize speech corresponding to a spoken natural language in the received audio data 211, and to perform functions in response to the recognized speech. In at least some embodiments, these functions involve sending directives (e.g., commands), from the system 120 to the device 110 to cause the device 110 to perform an action, such as output synthesized speech (responsive to the spoken natural language input) via a loudspeaker(s), and/or control one or more secondary devices by sending control commands to the one or more secondary devices.

Thus, when the device 110 is able to communicate with the system 120 over the network(s) 199, some or all of the functions capable of being performed by the system 120 may be performed by sending one or more directives over the network(s) 199 to the device 110, which, in turn, may process the directive(s) and perform one or more corresponding actions. For example, the system 120, using a remote directive that is included in response data (e.g., a remote response), may instruct the device 110 to output synthesized speech via a loudspeaker(s) of (or otherwise associated with) the device 110, to output content (e.g., music) via the loudspeaker(s) of (or otherwise associated with) the device 110, to display content on a display of (or otherwise associated with) the device 110, and/or to send a directive to a secondary device (e.g., a directive to turn on a smart light). It will be appreciated that the system 120 may be configured to provide other functions in addition to those discussed herein, such as, without limitation, providing step-by-step directions for navigating from an origin location to a destination location, conducting an electronic commerce transaction on behalf of the user 105 as part of a shopping function, establishing a communication session (e.g., an audio or video call) between the user 105 and another user, and so on.

The device 110 may include a wakeword detection component 220 configured to detect a wakeword (e.g., "Alexa") that indicates to the device 110 that the audio data 211 is to be processed for determining NLU output data. In at least some embodiments, a hybrid selector 224, of the device 110, may send the audio data 211 to the wakeword detection component 220. If the wakeword detection component 220 detects a wakeword in the audio data 211, the wakeword detection component 220 may send an indication of such detection to the hybrid selector 224. In response to receiving the indication, the hybrid selector 224 may send the audio data 211 to the system 120 and/or an on-device ASR component 150. The wakeword detection component 220 may also send an indication, to the hybrid selector 224, representing a wakeword was not detected. In response to receiving such an indication, the hybrid selector 224 may refrain from sending the audio data 211 to the system 120, and may prevent the on-device ASR component 150 from processing the audio data 211. In this situation, the audio data 211 can be discarded.

The device 110 may conduct its own speech processing using on-device language processing components (such as an on-device SLU component, an on-device ASR component 250, and/or an on-device NLU component 260) similar to the manner discussed above with respect to the ASR component 150 and the NLU component 160. The device 110 may also internally include, or otherwise have access to, other components such as one or more skills 290, a user recognition component 295 (configured to process in a similar manner to the user recognition component 195), profile storage 270 (configured to store similar profile data to the profile storage 170), and other components. In at least some embodiments, the on-device profile storage 270 may only store profile data for a user or group of users specifically associated with the device 110. The device 110 may also include a TTS component 280 that may operate in a similar manner as the TTS component 180.

In at least some embodiments, the on-device language processing components may not have the same capabilities as the language processing components implemented by the system 120. For example, the on-device language processing components may be configured to handle only a subset of the natural language inputs that may be handled by the speech processing system-implemented language processing components. For example, such subset of natural language inputs may correspond to local-type natural language inputs, such as those controlling devices or components associated with a user's home. In such circumstances the on-device language processing components may be able to more quickly interpret and respond to a local-type natural language input, for example, than processing that involves the system 120. If the device 110 attempts to process a natural language input for which the on-device language processing components are not necessarily best suited, the NLU output data, determined by the on-device components, may have a low confidence or other metric indicating that the processing by the on-device language processing components may not be as accurate as the processing done by the system 120.

The hybrid selector 224, of the device 110, may include a hybrid proxy (HP) 226 configured to proxy traffic to/from the system 120. For example, the HP 226 may be configured to send messages to/from a hybrid execution controller (HEC) 227 of the hybrid selector 224. For example, command/directive data received from the system 120 can be sent to the HEC 227 using the HP 226. The HP 226 may also be configured to allow the audio data 211 to pass to the system 120 while also receiving (e.g., intercepting) this audio data 211 and sending the audio data 211 to the HEC 227.

In at least some embodiments, the hybrid selector 224 may further include a local request orchestrator (LRO) 228 configured to notify the on-device ASR component 150 about the availability of the audio data 211, and to otherwise initiate the operations of on-device language processing when the audio data 211 becomes available. In general, the hybrid selector 224 may control execution of on-device language processing, such as by sending "execute" and "terminate" events/instructions. An "execute" event may instruct a component to continue any suspended execution (e.g., by instructing the component to execute on a previously-determined intent in order to determine a directive). Meanwhile, a "terminate" event may instruct a component to terminate further execution, such as when the device 110 receives directive data from the system 120 and chooses to use that remotely-determined directive data.

Thus, when the audio data 211 is received, the HP 226 may allow the audio data 211 to pass through to the system 120 and the HP 226 may also input the audio data 211 to the ASR component 250 by routing the audio data 211 through the HEC 227 of the hybrid selector 224, whereby the LRO 228 notifies the ASR component 250 of the audio data 211. At this point, the hybrid selector 224 may wait for response data from either or both the system 120 and/or the on-device language processing components. However, the disclosure is not limited thereto, and in some examples the hybrid selector 224 may send the audio data 211 only to the ASR component 250 without departing from the disclosure. For example, the device 110 may process the audio data 211 on-device without sending the audio data 211 to the system 120.

The ASR component 250 is configured to receive the audio data 211 from the hybrid selector 224, and to recognize speech in the audio data 211, and the on-device NLU component 160 is configured to determine an intent from the recognized speech (an optionally one or more named entities), and to determine how to act on the intent by generating NLU output data that may include directive data (e.g., instructing a component to perform an action). In some cases, a directive may include a description of the intent (e.g., an intent to turn off {device A}). In some cases, a directive may include (e.g., encode) an identifier of a second device(s), such as kitchen lights, and an operation to be performed at the second device(s). Directive data may be formatted using Java, such as JavaScript syntax, or JavaScript-based syntax. This may include formatting the directive using JSON. In at least some embodiments, a device-determined directive may be serialized, much like how remotely-determined directives may be serialized for transmission in data packets over the network(s) 199. In at least some embodiments, a device-determined directive may be formatted as a programmatic application programming interface (API) call with a same logical operation as a remotely-determined directive. In other words, a device-determined directive may mimic a remotely-determined directive by using a same, or a similar, format as the remotely-determined directive.

A NLU hypothesis (output by the NLU component 260) may be selected as usable to respond to a natural language input, and local response data may be sent (e.g., local NLU output data, local knowledge base information, internet search results, and/or local directive data) to the hybrid selector 224, such as a "ReadyToExecute" response. The hybrid selector 224 may then determine whether to use directive data from the on-device components to respond to the natural language input, to use directive data received from the system 120, assuming a remote response is even received (e.g., when the device 110 is able to access the system 120 over the network(s) 199), or to determine output data requesting additional information from the user 105.

The device 110 and/or the system 120 may associate a unique identifier with each natural language input. The device 110 may include the unique identifier when sending the audio data 211 to the system 120, and the response data from the system 120 may include the unique identifier to identify to which natural language input the response data corresponds.

The device 110 may also include an interactive content component 292 and an interactive content storage 293, which may be similar to the interactive content component 192 and the interactive content storage 193 described herein.

In at least some embodiments, the device 110 may include one or more skills 290 that may process similarly to the skill(s) 190. The skill(s) 290 installed on (or in communication with) the device 110 may include, without limitation, a smart home skill and/or a device control skill configured to control a second device(s), a music skill configured to output music, a navigation skill configured to output directions, a shopping skill configured to conduct an electronic purchase, and/or the like.

One or more of the components described herein may employ a machine learning (ML) model(s). Generally, ML models may be trained and operated according to various machine learning techniques. Such techniques may include, for example, neural networks (such as deep neural networks and/or recurrent neural networks), inference engines, trained classifiers, etc. Examples of trained classifiers include Support Vector Machines (SVMs), neural networks, decision trees, AdaBoost (short for "Adaptive Boosting") combined with decision trees, and random forests. Focusing on SVM as an example, SVM is a supervised learning model with associated learning algorithms that analyze data and recognition patterns in the data, and which are commonly used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers may issue a "score" indicating which category the data most closely matches. The score may provide an indication of how closely the data matches the category.

In order to apply machine learning techniques, machine learning processes themselves need to be trained. Training a machine learning model requires establishing a "ground truth" for the training examples. In machine learning, the term "ground truth" refers to the accuracy of a training set's classification for supervised learning techniques. Various techniques may be used to train the models including backpropagation, statistical learning, supervised learning, semi-supervised learning, stochastic learning, or other known techniques.

FIG. 3 is a conceptual diagram illustrating example components of the interactive content component 192, according to embodiments of the present disclosure. The interactive content component 192 may include components to facilitate one or more operations described herein. The interactive content component 192 may include fewer or more components than shown in FIG. 3. In example embodiments, the interactive content component 192 may include a content handler component 315 and the interactive content storage 193 for determining and storing content corresponding to items, actions that can be performed with respect to the items, skill components that can perform the actions, sample inputs that trigger performance of the action, and other data to enable interaction with the content.

In some embodiments, the interactive content component 192 may receive content corresponding to an item(s) from a content system(s) 305. The content system(s) 305 may send content data 306, which may include data representing the content, such as, audio data (e.g., a mp3 file, a way file, etc.), video data (e.g., a mp4 file, a mov file, etc.), image data (e.g., a jpeg file, a gif file, etc.), and other types of data. The content corresponding to the item(s), as used herein, may refer to an advertisement for the item(s), description of the item(s), a description of a coupon or discount for the item(s), or other information related to the item(s). The content corresponding to the items may provide information related to more than one item. The content corresponding to the item(s) may be prerecorded content. The content data 306 may further include an item identifier for each of the items the content relates to. The item identifier may be used to perform actions with respect to the item. For example, using the item identifier, a skill component 190*b* may add the item to an electronic shopping cart or cause a sample of the item to be sent to the user 105. The content data 306 may further include an action(s) that can be performed with respect to the item(s). For example, the action may be add to electronic shopping cart, send sample, play trailer, clip the coupon, send more information, set a reminder, add to calendar, etc. In some embodiments, the content data 306 may be provided by a user (e.g., a product or service owner) using a user interface that solicits the particular data, including the content corresponding to the items, item identifiers, and actions that can be performed with respect to the items. In some embodiments, the content data 306 may also include an output voice style to be used to present the interactive content to the user 105. Details on how a particular voice style may be used are described below in relation to FIGS. 5 and 7A-7B.

The content handler component 315 may process the content data 306, and may store content data 308 in the interactive content storage 193. In processing the content data 306, the content handler component 315 may determine one or more skill components 190 capable of performing the actions indicated in the content data 306. In some embodiments, the interactive content component 192 may be configured to invoke a skill component from a pre-defined set of skill components that may be configured to perform a particular set of actions. For example, the pre-defined set of skill components may be a shopping skill, a calendar skill, a content streaming skill, a video skill, and a music skill. An example set of actions may be add to cart, send a sample, clip a coupon, set a reminder, add an event, play a trailer, and play a song. The interactive content component 192 may include a mapping of which skill is capable of performing which action, and may determine the skill component 190 capable of perform the actions indicated in the content data 306 using the mappings. In other embodiments, the interactive content component 192 may use a skill selection component, that may be operate in a similar manner as the post-NLU ranker component 165, to select a skill component 190 capable of performing the actions indicated in the content data 306.

The content handler component 315 may also determine one or more sample inputs that may trigger performance of the action. In some embodiments, the interactive content component 192 may include a pre-defined set sample inputs for a particular set of actions. In other embodiments, the interactive content component 192 may send a request to the skill component 190 to provide a sample input to trigger performance of an action. In other embodiments, the interactive content component 192 may receive the sample input from the content system(s) 305. In yet other embodiments, the interactive content component 192 may use natural language generation (NLG) techniques to determine the sample input based on the actions indicated in the content data 306.

Figure 4:
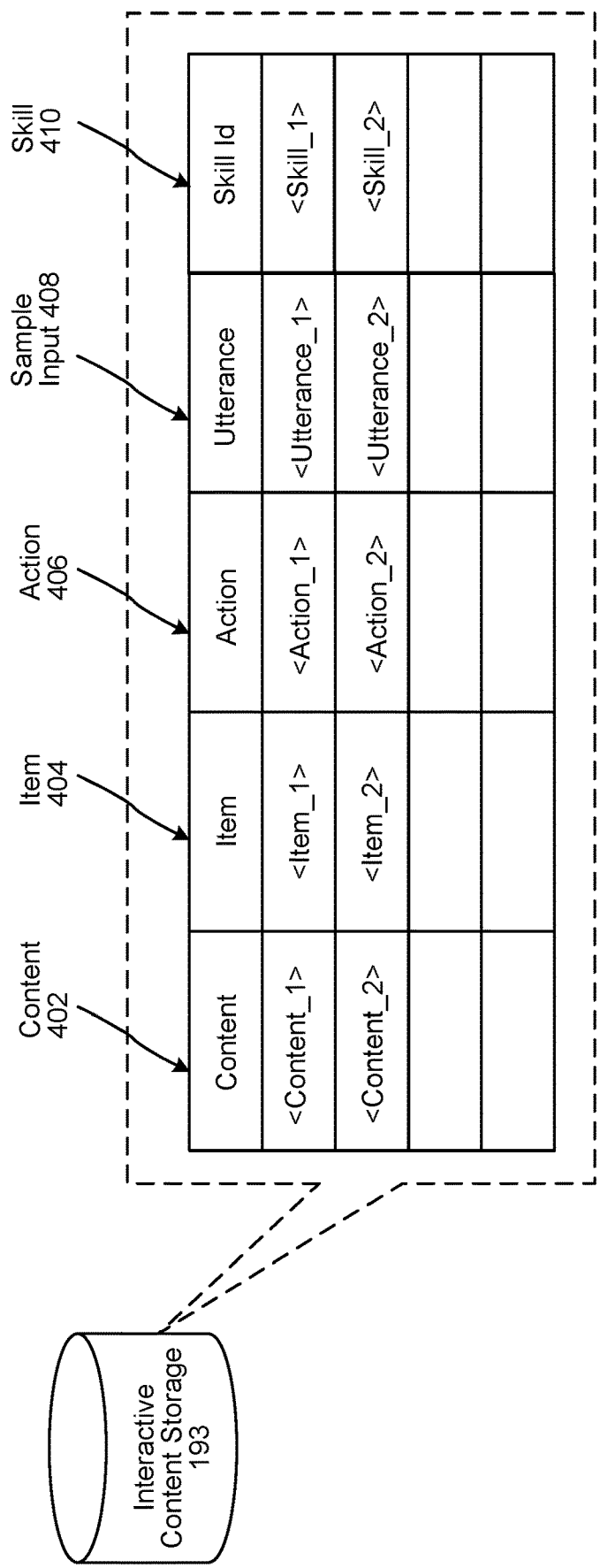
FIG. 4 illustrates example data that may be stored at an interactive content storage, according to embodiments of the present disclosure.

FIG. 4 illustrates example data that may be stored at the interactive content storage 193. For example, an instance of content data 308 may include content data 402, which may be the audio data, video data, and/or image data representing the content corresponding to the items. An instance of content data 308 may also include item data 404, which may be a name of the item and the corresponding item identifier; action data 406, which may be the action that can be performed with respect to the item indicated in the item data 404; sample input data 408, which may be text data or token data corresponding to an input that triggers performance of the action indicated in the action data 406; and skill data 410, which may be a skill identifier corresponding to the skill component that can perform the action indicated in the action data 406. In other embodiments, the interactive content storage 193 may include other data to facilitate performance of the action indicated in the action data 406. For example, a skill component (e.g., a shopping skill component) may need particular data (e.g., an item identifier and a user profile identifier) to perform the indicated action (e.g., add the item to the user's electronic shopping cart), and the instance of content data 308 may indicate which types of data the skill component needs (may store the input fields, input arguments, input variables, etc. for the skill component). The interactive content component 192 may determine the types of data the skill component needs based on a table storing such information. In other embodiments, the interactive content component 192 may send a request to the skill component 190 requesting the types of data the skill component needs to process a user input.

Examples of sample inputs may be "yes," "Alexa clip the coupon," "send me a sample," "play the trailer," "play," "email me information," "send information to my phone," etc. In some cases, an instance of content data 308 may include more than one sample input that can trigger performance of the action indicated in the action data 406. In some embodiments, the sample input may indicate a gesture (e.g., thumbs up), selection of a physical button on the device 110, or selection of a graphical interface element via the device 110 that may trigger performance of the action.

After the content data 308 is determined and stored by the content handler component 315, the stored content data 308 may be used to determine interactive content for output when a skill component requests such content for output. The stored content data 308 may also be used to determine what action is to be performed with respect to the interactive content.

For example, the skill component 190*a* may generate a request 302 for content. In some cases, the skill component 190*a* may be outputting content requested by the user 105. In some embodiments, such requested content may be long-form content, such as, music, a radio station, a podcast, a news briefing, a movie, a TV show, an audio book, etc. Certain skill components may indicate that content unresponsive to a user input can be outputted while certain requested content is being outputted. To enable this, the skill component 190*a* may have embedded a marker in the requested content, where the marker may indicate when unresponsive content (e.g., advertisements, coupons, etc.) can be presented. For example, the marker may be at 5 minutes after start of the requested content, may be at the end of a portion of the content (e.g., end of a song, end of playlist, end of album, end of episode, etc.), may be before outputting the next item in the requested content (e.g., before the next news briefing, before next podcast episode, etc.), etc. When the marker is reached during output of the requested content, the skill component 190*a* may send the request 302. Other techniques for marking content or indicating when content unresponsive to a user input can be outputted may be used.

In some cases the request 302 may indicate the type of content requested. For example, the request 302 may request an audio-based interactive content (i.e. content that does not have video data), a video-based interactive content, content for a particular item, etc. Based on receiving the request 302, the content handler component 315 may retrieve the content data 308 from the interactive content storage 193. In some embodiments, the interactive content component 192 may keep track of content 308 being previously outputted for a particular device (using a device identifier for the device 110), a particular user (using a user profile identifier for the user 105), or a particular account (using an account identifier for an account associated with the device 110; more than one user may be associated with one account). In retrieving the content 308 from the interactive content storage 193, the content handler component 315 may retrieve the content 308 based on it not being previously outputted for the device 110, the user 105 or the account for the user 105. In this manner, previously outputted content (e.g., advertisement, coupon, information, etc.) is not outputted again for the device 110, the user 105 or users of the account.

After retrieving the content 308 from the interactive content storage 193, the interactive content component 192 may perform certain steps in preparation for outputting interactive content. One of the steps may involve a skill focus component 325, of the interactive content component 192, generating and storing focus data indicating that the skill component 190a was previously active at the device 110. The focus data may be based on the skill component 190a sending the request 302. In other embodiments, the focus data may be based on data made available by other components of the system 120 (e.g., the orchestrator component 130). In other embodiments, such focus data may be stored by other components of the system 120 (e.g., the orchestrator component 130).

Another step may involve a context component 310, of the interactive content component 192, generating and storing context data indicating that the interactive content component 192 is in focus at the device 110 and outputting interactive content. The context data may be based on output data 322 being sent to the orchestrator component 130 for output at the device 110. In other embodiments, the context data may be based on data made available by other components of the system 120 (e.g., the orchestrator component 130). In other embodiments, such context data may be stored by other components of the system 120 (e.g., the orchestrator component 130). As described below, the context data generated by the context component 310 may be provided to the post-NLU ranker component 165.

Figure 5:
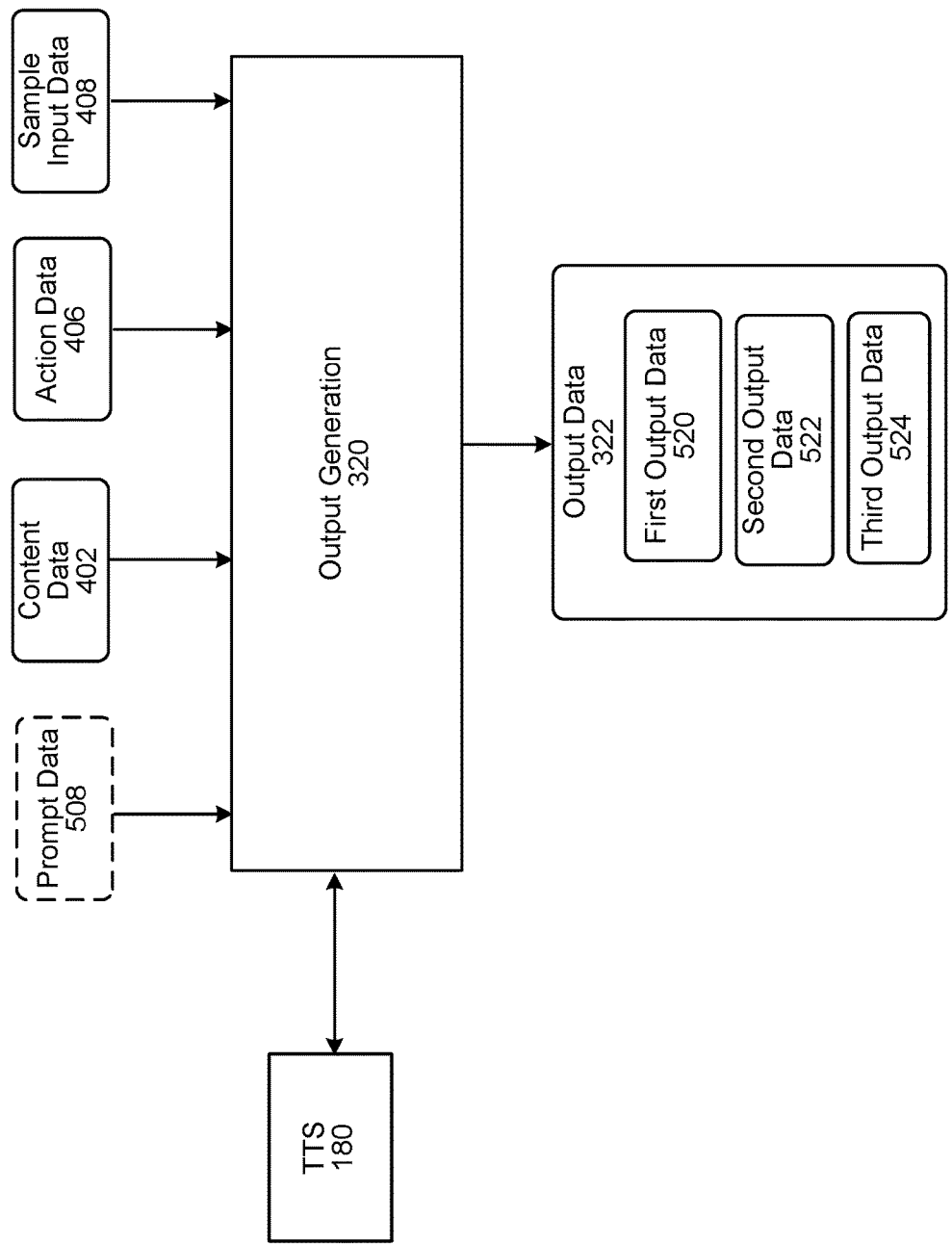
FIG. 5 is a conceptual diagram illustrating how an output generation component may determine output data corresponding to the interactive content, according to embodiments of the present disclosure.

Another step may involve an output generation component 320, of the interactive content component 192, generating the output data 322 using the content data 308. FIG. 5 illustrates how the output generation component 320 may generate the output data 322. In some embodiments, the interactive content outputted at the device 110 may include multiple portions, each portion corresponding to a different part of the interactive content. In an example embodiment, the interactive content may include (1) a first portion indicating, to the user 105, that the user can interact with the content that is about to follow (about to be outputted); (2) a second portion including content corresponding to an item(s) (e.g., the advertisement for the item, the coupon for the item, the information for the item, etc.); and (3) a third portion indicating an action(s) that the user 105 can perform with respect to the item(s). The output generation component 320 may generate these portions separately, and may combine them to generate the output data 322.

Referring to FIG. 5, in some embodiments, the output generation component 320 may receive prompt data 508, which may be text data, token data, or other natural language structure data, representing the first portion of the interactive content. For example, the prompt data may be text or token data representing "You can interact with the following content. Keep listening to learn how", "The following content is an ad you will be able to interact with after it is over", "The upcoming content is interactive. Stay tuned to learn how", or other similar natural language indicating that content that is about to follow is interactive. In some embodiments, such prompt data 508 may be provided by the content system(s) 305, or may be predefined by the interactive content component 192 or the output generation component 320. The output generation component 320 may generate first output data 520 using the prompt data 508. In some embodiments, the first output data 520 may be audio data corresponding to synthesized speech determined by processing the prompt data 508 using the TTS component 180. In generating the synthesized speech, the TTS component 180 may use a particular voice profile, as described below in relation to FIGS. 7A and 7B, where the voice profile may be selected by the output generation component 320 or may be based on a voice profile indicated by the content system(s) 305. In other embodiments, the first output data 520 may be text data representing a natural language output generated by processing the prompt data 508 using natural language generation (NLG) techniques.

The output generation component 320 may receive the content data 402 (e.g., audio data, video data, or image data) representing the content for the item. Using the content data 402, the output generation component 320 may determine the second output data 522 corresponding to the second portion of the interactive content. In some embodiments, the second output data 522 may be the content data 402, as provided by the content system(s) 305. In other embodiments, the output generation component 320 may perform some processing using the content data 402 to determine the second output data 522, so that the second output data 522 is of a particular format, a particular output quality, a particular size, etc.

The output generation component 320 may receive the action data 406 and the sample input data 408, and may generate third output data 524 using the action data 406 and the sample input data 408. In some embodiments, the output generation component 320 may use NLG techniques to process the action data 406 and the sample input data 408 to determine a natural language output. For example, if the action data 406 indicates <ClipCoupon> and the sample input data 408 indicates "Alexa, clip the coupon," then the output generation component 320 may determine the corresponding natural language output to be "you can clip the coupon by saying Alexa clip the coupon." As another example, if the action data 406 indicates <SetReminder> and the sample input data 408 indicates "yes", then the corresponding natural language output may be "to set a reminder just say yes." Thus, the natural language output may be based on a combination of the action data 406 and the sample input data 408 to indicate to the user 105 how the user can interact with the system 120 regarding the content data 402/the second output data 522. In some embodiments, the third output data 524 may be audio data representing synthesized speech corresponding to the natural language output, determined by processing the natural language output using the TTS component 180. In generating the synthesized speech, the TTS component 180 may use a particular voice profile, as described below in relation to FIGS. 7A and 7B, where the voice profile may be selected by the output generation component 320 or may be based on a voice profile indicated by the content system(s) 305. In other embodiments, the third output data 524 may be text data representing the natural language output.

In some embodiments, the second output data 522 may include output data indicating the action that can be performed by the user 105. For example, the audio or video file may include information on the action the user can perform with respect to the item.

The output generation component 320 may determine the output data 322 by combining the first output data 520, the second output data 522 and the third output data 524. In some embodiments, the output data 322 may indicate a sequence in which the portions of the output data 322 are to be outputted. For example, the first output data 520 may be outputted first, followed by the second output data 522, and then the third output data 524. In some embodiments, the first output data 520 and the third output data 524 may be of the same type, for example, audio data representing synthesized speech. In other embodiments, the first output data 520 and the third output data 524 may of different types, for example, the first output data 520 may be audio data representing synthesized speech and the third output data 524 may be text data (which may be displayed at the device 110). In some embodiments, the output generation component 320 may determine the type of the first output data 520 and the third output data 524 based on the capabilities of the device 110.

The interactive content component 192 may send the output data 322 to the orchestrator component 130 for output at the device 110 (e.g., as described in relation to the step 13 in FIG. 1). As described above in relation to FIG. 1, the user 105 may provide an input in response to the output of the interactive content or after the interactive content is outputted at the device 110. The system 120 may determine ASR data 324 and NLU data 326 corresponding to such user input, and may provide the ASR data 324 and the NLU data 326 to the interactive content component 192 as shown in FIG. 3.

The post-NLU ranker component 165 may select the interactive content component 192 to respond to the user input based on the context data, provided by the context component 310, indicating that interactive content was outputted at the device 110 by the interactive content component 192. In some embodiments, the post-NLU ranker component 165 may select the interactive content component 192 to respond to the user input based on the elapsed time between output of the interactive content and the time the user input is received by the system 120. The post-NLU ranker component 165 may select the interactive content component 192 to respond to the user input based on the intent and/or entity indicated in the NLU data 326. Details on how the post-NLU ranker component 165 processes are described below in relation to FIG. 6.

In response to receiving the ASR data 324 and the NLU data 326, the content handler 315 may determine whether the user input requests performance of the action (indicated in the third output data 524). For example, if the ASR data 324 indicates the user 105 said "yes" and/or the NLU data 326 indicates <YesIntent>, then the content handler component 315 may determine to perform the action. As another example, the content handler component 315 may compare the ASR data 324 and/or the NLU data 326 to the sample input data 410, corresponding to the content 408 that was outputted, to determine whether the user input requests performance of the action with respect to the item(s).

If the user input requests performance of the action, then the content handler component 315 may determine a skill component capable of performing the action using the skill data 410 corresponding to the content 408 that was outputted and the corresponding action 406. Using the skill data 410, the content handler component 315 may invoke the skill component 190b associated with the skill identifier included in the skill data 410.

The content handler component 315 may send a command, to the skill component 190b, to perform the action with respect to the item(s). In some embodiments, the content handler component 315 may send the action data 406 and the item data 404 to the skill component 190b. The content handler component 315 may send any other data that the skill component 190b may need to perform the action. In some embodiments, the skill component 190b may request data it needs to perform the action, and may request such data from the interactive content component 192 or the orchestrator component 130 after receiving the command from the content handler component 315. Once the action is completed, the skill component 190b may send an indication to the content handler component 315 that the action is completed.

In response to receiving the indication from the skill component 190b, the content handler component 315 may send an indication to the skill component 190a to resume its session at the device 110. The content handler component 315 may send this indication based on the focus data stored at the skill focus component 325 indicating that the skill component 190a was previously active. In this manner, the interactive content component 192 may hand back control to the skill component 190a so that it can continue outputting requested content.

The interactive content component 192 may include a metrics component 330 that may be configured to generate metrics data 332 based on outputting of the output data 322 and performance of the action by the skill component 190b. The metrics component 330 may track when particular content data 402 is outputted for a user. The metrics component 330 may also track whether a user requests performance of the action indicated in the output. In some embodiments, the metrics component 330 may receive an indication from the content handler component 315 that the content 402 is being outputted at the device 110. Such indication may be associated with data including a device identifier for the device 110, a user profile identifier for the user 105, an account identifier for an account of the user 105, a content identifier associated with the content 402, and/or a time when interactive content including the content 402 is outputted at the device 110. The metrics data 332 may include the indication and the associated data. In some embodiments, the metrics component 330 may receive another separate indication, from the content handler component 315, for whether or not the user 105 requests performance of the action with respect to the item included in the content 402. Such indication may be a Boolean value (e.g., "yes" or "no"). Such indication may be associated with data including the action performed and a time the action is performed. The metrics data 332 may include the indication and the associated data. The metrics data 332 may be provided to the content system(s) 305 to enable the content system(s) 305 to track interactions with their generated content. Additionally or alternatively, the skill component 190b may provide some metrics data to the content system(s) 305 related to the action performed by the skill component 190b. For example, the skill component 190b may provide metrics data indicating when the user 105 completed a purchase of the item added to the electronic shopping cart, when the user 105 purchases the item for which the coupon was clipped, when the user 105 watches the movie/TV show for which the trailer was requested, etc.

Figure 6:
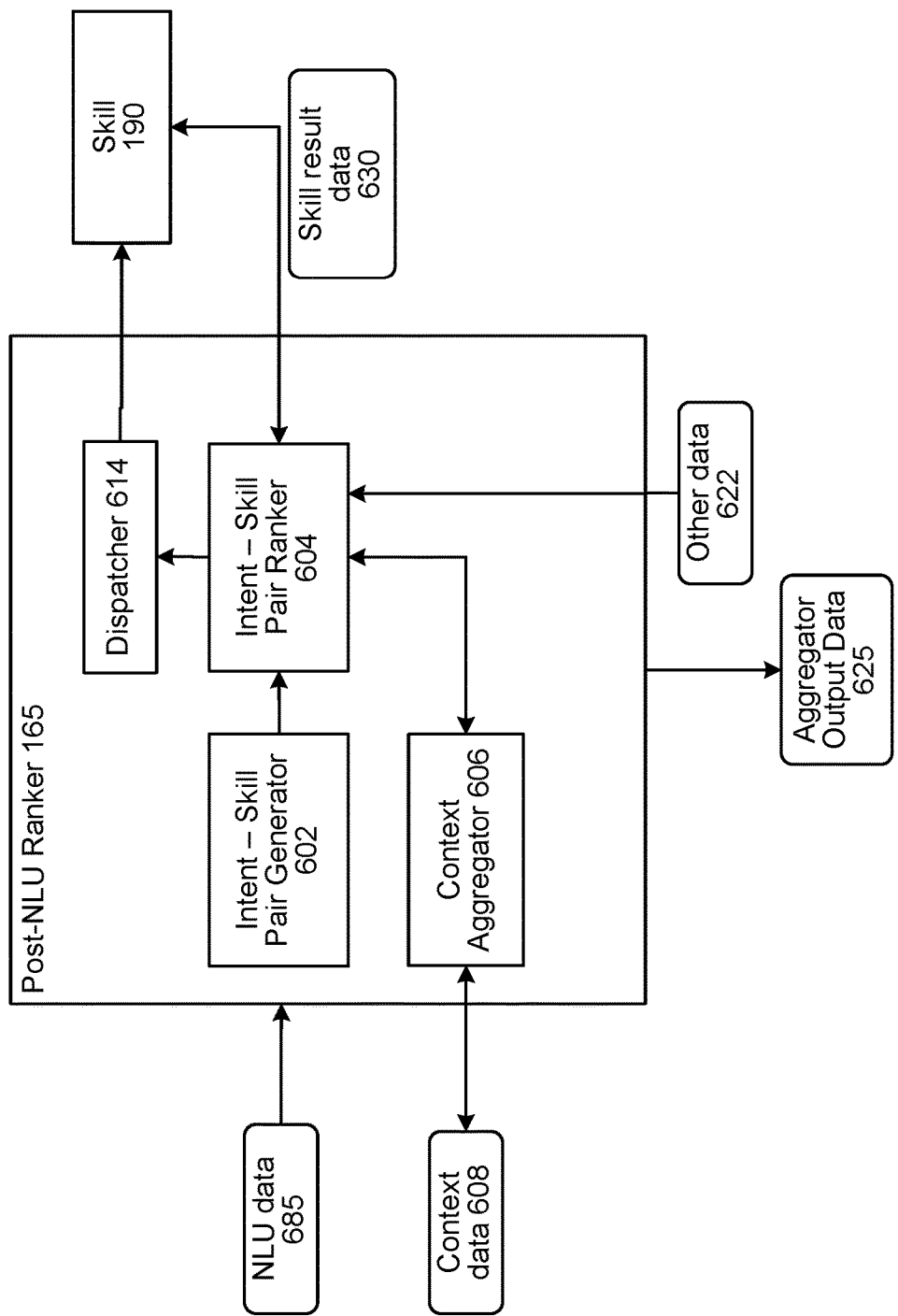
FIG. 6 is a conceptual diagram illustrating how a post-NLU ranker may process, according to embodiments of the present disclosure.

FIG. 6 illustrates other configurations and operations of the post-NLU ranker component 165. When the post-NLU ranker component 165 receives NLU data 685 from the NLU component 160, the NLU data 685 may be sent to an intent-skill pair generator 602. The intent-skill pair generator 602 may include information about what skills are capable of handling what intents. Such information may be context agnostic, and may thus indicate what skills are capable of handling what intents generally, without regard to the context associated with the user input. The intent-skill pair generator 602 thus receives the NLU data 685 and identifies what particular candidate skills may handle the intent for NLU hypothesis. For example, if a NLU hypothesis includes a particular intent, the intent-skill pair generator 602 identifies each skill that may execute with respect to the intent. For further example, if the NLU data 685 include multiple NLU hypotheses including multiple intents, the intent-skill pair generator 602 associates each different NLU hypothesis with each skill that may execute with respect to the NLU hypothesis. As illustrated, the intent-skill pair generator 602 may be implemented at part of the post-NLU ranker component 165. However, one skilled in the art will appreciate that the intent-skill pair generator 602 may be implemented as part of the NLU component 160 or in another component without departing from the present disclosure. In such a case, the NLU data 685 may include intent-skill pairs.

The post-NLU ranker component 165 may also include an intent-skill pair ranker 604. The intent-skill pair ranker 604 ranks the intent-skill pairs generated by the intent-skill pair generator 602 based on, for example, the number of filled slots of a NLU hypothesis, an NLU confidence score associated with a NLU hypothesis, context information output by a context aggregator 606, and/or other data.

The post-NLU ranker component 165 may include the context aggregator 606. The context aggregator 606 receives context data 608 from various contextual sources, including the interactive content component 192. The context data 608 may include time data, which represents a time of receipt of the user input by the device 110, a time or receipt of the user input by the system(s) 120, a user identifier associated with the user input, a device identifier of the device 110, whether other devices are linked to the device 110, and/or other information. The context aggregator 606 may aggregate the context data 608 and put the context data 608 in a form that can be processed by the intent-skill pair ranker 604. Context data 608 may include data obtained from the device 110 or from other services connected to the system(s) 120.

The context data 608 may include skill availability data. Such information may indicate what skills are available and authorized to process the user input. For example, if the user has only enabled certain skills, the enabled skills may be noted in the skill availability data.

The context data 608 may also include dialog data. A "dialog" or "dialog session" as used herein may refer to data transmissions (such as relating to multiple user inputs and system(s) 120 outputs) between the system(s) 120 and a local device (e.g., the device 110) that all relate to a single originating user input. Thus, the data transmissions of a dialog session may share a dialog identifier or other unique identifier that may be used by the orchestrator component 130, skill(s) 190, skill server(s) 125, etc. to track information across the dialog session. For example, the device 110 may send the system(s) 120 data corresponding to "Alexa, play jeopardy." The system(s) 120 may output data corresponding to a jeopardy statement to the device 110 for output to a user(s). A user may then respond to the statement, which the device 110 sends as data to the system(s) 120. The sending of data from the device 110 to the system(s) 120 and the sending of data from the system(s) 120 to the device 110 may all correspond to a single dialog session related to the originating user input "play jeopardy." In some examples, a dialog-initiating user input may start with a wakeword and end with a command, such as "Alexa, play jeopardy," where "Alexa" is the wakeword and "play jeopardy" is the command. Subsequent user inputs of the same dialog session may or may not start with speaking of a wakeword. Each user input of a dialog may be associated with a unique user input identifier such that multiple user input identifiers may be associated with a single dialog session identifier.

Dialog data may include interactive focus information, (e.g., representing which skill was most recently invoked to execute a previous user input for the user and/or device 110 associated with the present user input). Dialog data may also include content focus information (e.g., representing a skill that is streaming data to the device 110 when the data corresponding to the current user input is received by the system(s) 120). The context data 608 may be one portion of the data used by the intent-skill pair ranker 604 to determine which skill should execute the current user input. Thus, unlike certain systems that use interactive focus and content focus as binary determinations regarding which skill should execute a current user input, the presently disclosed architecture considers focus along with other data, thereby minimizing disproportionate routing.

The context data 608 may also include device data. Device data may indicate characteristics of the device 110 from which the user input was received. For example, such data may include information such as display capabilities of the device, a quality of one or more speakers of the device, a device type, etc. Certain capabilities of a solo device or group of devices may be stored with the system and looked up during a particular interaction to determine if a device/group of devices can handle a go-back request. Device data may also represent a skill with which the device 110 is associated. The device data may also indicate whether the device 110 is currently streaming data or was streaming data when the user input was received and sent to the system(s) 120. The context data 608 (and/or other data 622) may include a metadata flag/indicator that represents whether the particular skill being executed is one that can handle a go-back (or other navigational) request.

The context data 608 may also include user profile data. The user profile data may represent preferences and/or characteristics of the user that originated the current user input. Such data may be received from the profile storage 170.

The context data 608 may also include location data. The location data may represent a location of the device 110 from which the user input was received.

The context data 608 may also include anaphora data. Anaphora data may be data used to resolve anaphora, exophora, or other references (like pronouns such as he, she, etc.) to entities that are not explicitly named in a user input. The anaphora data may include entity identifiers or other information used to resolve anaphoric references in a user input.

The context data 608 may also include data regarding whether one or more skills are "in focus." A skill may be in interactive focus, meaning the skill was the most recent skill that executed a user input for a user or device associated with a present user input and/or the skill may be involved with an open dialog (e.g., series of user inputs and responses) with a user device. Interactive focus attempts to continue a conversation between a user and the system and/or a skill for purposes of processing the dialog. However, there may be instances where a user inputs a command that may be handled by a skill that is currently in interactive focus, but which the user does not intend to be executed by such skill. The system may process the context data 608 and other data to determine how best to process a user input when one or more skills may be in focus.

A skill may alternatively be in content focus, meaning the skill is associated with content that is streaming to the user and/or device associated with a current user input when the current user input is received by the system. For example, a previous user input of "Play music" may result in the system streaming music to a device from a specific music skill. While the skill is streaming the music, the same user may input a second user input. Since the second user input was received when the music skill was streaming the music, the system may query that music skill in the first instance, even if the second user input is not necessarily intended for the music skill. The music skill may be configured to attempt to execute the subsequent user input (and potentially output an error) even though the user may have intended another skill to execute such user input.

The context data 608 may also include other context data not explicitly recited herein.

The intent-skill pair ranker 604 may operate one or more trained models that are configured to process the NLU data 685, skill result data 630, and other data 622 in order to determine a single best skill for executing the current user input from the available pairs output by the intent-skill pair generator 602. The intent-skill pair ranker 604 may send queries to the skills and request a first skill and a second skill (for example the candidate skills identified by the pair generator 602), to provide potential result data indicating whether the skill can handle the intent at the particular moment and if so, what the output data for the particular skill would be (e.g., data the skill would provide to a user if the skill were selected to execute the user input) based on the NLU data 685. For example, the intent-skill pair ranker 604 may send a first NLU hypothesis, associated with a first skill, to the first skill along with a request for the first skill to at least partially execute with respect to the first NLU hypothesis. The intent-skill pair ranker 604 may also send a second NLU hypothesis, associated with the second skill, to the second skill along with a request for the second skill to at least partially execute with respect to the second NLU hypothesis. The intent-skill pair ranker 604 receives, from the first skill, first result data 630a generated from the first skill's execution with respect to the first NLU hypothesis. The intent-skill pair ranker 604 also receives, from the second skill, second results data 630b generated from the second skill's execution with respect to the second NLU hypothesis. Based on the first results data 630a, a first NLU confidence score associated with the first NLU hypothesis, the second results data 630b, a second NLU confidence score associated with the second NLU hypothesis, and other data 622 (e.g., context data, user profile data, etc.), the intent-skill pair ranker 604 determines the best skill for executing the current user input. The intent-skill pair ranker 604 sends an indication of the best skill to a dispatcher component 614.

The dispatcher 614 may then send the selected skill the information needed to execute the user input, including an indication of the intent, the appropriate context data 608 (such as device identifier, user identifier, or the like), slot data, utterance identifier, dialog identifier, or any other information needed.

Components of a system that may be used to perform unit selection, parametric TTS processing, and/or model-based audio synthesis are shown in FIG. 7A. As shown in FIG. 7A, the TTS component/processor 180 may include a TTS front end 716, a speech synthesis engine 718, TTS unit storage 772, TTS parametric storage 780, and a TTS back end 734. The TTS unit storage 772 may include, among other things, voice inventories 778a-788n that may include pre-recorded audio segments (called units) to be used by the unit selection engine 730 when performing unit selection synthesis as described below. The TTS parametric storage 780 may include, among other things, parametric settings 768a-768n that may be used by the parametric synthesis engine 732 when performing parametric synthesis as described below. A particular set of parametric settings 768 may correspond to a particular voice profile (e.g., whispered speech, excited speech, etc.).

In various embodiments of the present disclosure, model-based synthesis of audio data may be performed using by a speech model 722 and a TTS front-end 716. The TTS front-end 716 may be the same as front ends used in traditional unit selection or parametric systems. In other embodiments, some or all of the components of the TTS front end 716 are based on other trained models. The present disclosure is not, however, limited to any particular type of TTS front end 716. The speech model 722 may be used to synthesize speech without requiring the TTS unit storage 772 or the TTS parametric storage 780, as described in greater detail below.

The TTS front end 716 transforms input data (from, for example, an application, user, device, or other sources such the output generation component 320 of the interactive content component 192) into a symbolic linguistic representation, which may include linguistic context features such as phoneme data, punctuation data, syllable-level features, word-level features, and/or emotion, speaker, accent, or other features for processing by the speech synthesis engine 718. The syllable-level features may include syllable emphasis, syllable speech rate, syllable inflection, or other such syllable-level features; the word-level features may include word emphasis, word speech rate, word inflection, or other such word-level features. The emotion features may include data corresponding to an emotion, such as surprise, anger, or fear. The speaker features may include data corresponding to a type of speaker, such as sex, age, or profession. The accent features may include data corresponding to an accent associated with the speaker, such as Southern, Boston, English, French, or other such accent. The input data may be natural language output data 702, which may include text data, token data, or other structured natural language data.

The TTS front end 716 may also process other input data 715, such as text tags or text metadata, that may indicate, for example, how specific words should be pronounced, for example by indicating the desired output speech quality in tags formatted according to the speech synthesis markup language (SSML) or in some other form. For example, a first text tag may be included with text marking the beginning of when text should be whispered (e.g., <begin whisper>) and a second tag may be included with text marking the end of when text should be whispered (e.g., <end whisper>). The output generation component 320 may include tags in the natural language output 702 (or other input data 715) indicating which attributes to apply to which portions of the text. The tags may be included in the natural language output 702 and/or the text for a TTS request may be accompanied by separate metadata indicating what text should be whispered (or have some other indicated audio characteristic). The speech synthesis engine 718 may compare the annotated phonetic units models and information stored in the TTS unit storage 772 and/or TTS parametric storage 780 for converting the input text into speech. The TTS front end 716 and speech synthesis engine 718 may include their own controller(s)/processor(s) and memory or they may use the controller/processor and memory of the server 120, device 110, or other device, for example. Similarly, the instructions for operating the TTS front end 716 and speech synthesis engine 718 may be located within the TTS component 180, within the memory and/or storage of the server 120, device 110, or within an external device.

The natural language output 702 inputted into the TTS component 180 may be sent to the TTS front end 716 for processing. The front-end may include components for performing text normalization, linguistic analysis, linguistic prosody generation, or other such components. During text normalization, the TTS front end 716 may first process the text input and generate standard text, converting such things as numbers, abbreviations (such as Apt., St., etc.), symbols ($, %, etc.) into the equivalent of written out words.

During linguistic analysis, the TTS front end 716 may analyze the language in the normalized text to generate a sequence of phonetic units corresponding to the input text. This process may be referred to as grapheme-to-phoneme conversion. Phonetic units include symbolic representations of sound units to be eventually combined and output by the system as speech. Various sound units may be used for dividing text for purposes of speech synthesis. The TTS component 180 may process speech based on phonemes (individual sounds), half-phonemes, di-phones (the last half of one phoneme coupled with the first half of the adjacent phoneme), bi-phones (two consecutive phonemes), syllables, words, phrases, sentences, or other units. Each word may be mapped to one or more phonetic units. Such mapping may be performed using a language dictionary stored by the system, for example in the TTS storage component 772. The linguistic analysis performed by the TTS front end 716 may also identify different grammatical components such as prefixes, suffixes, phrases, punctuation, syntactic boundaries, or the like. Such grammatical components may be used by the TTS component 180 to craft a natural-sounding audio waveform output. The language dictionary may also include letter-to-sound rules and other tools that may be used to pronounce previously unidentified words or letter combinations that may be encountered by the TTS component 180. Generally, the more information included in the language dictionary, the higher quality the speech output.

Based on the linguistic analysis the TTS front end 716 may then perform linguistic prosody generation where the phonetic units are annotated with desired prosodic characteristics, also called acoustic features, which indicate how the desired phonetic units are to be pronounced in the eventual output speech. During this stage the TTS front end 716 may consider and incorporate any prosodic annotations that accompanied the text input to the TTS component 180. Such acoustic features may include syllable-level features, word-level features, emotion, speaker, accent, language, pitch, energy, duration, and the like. Application of acoustic features may be based on prosodic models available to the TTS component 180. Such prosodic models indicate how specific phonetic units are to be pronounced in certain circumstances. A prosodic model may consider, for example, a phoneme's position in a syllable, a syllable's position in a word, a word's position in a sentence or phrase, neighboring phonetic units, etc. As with the language dictionary, prosodic model with more information may result in higher quality speech output than prosodic models with less information. Further, a prosodic model and/or phonetic units may be used to indicate particular speech qualities of the speech to be synthesized, where those speech qualities may match the speech qualities of input speech (for example, the phonetic units may indicate prosodic characteristics to make the ultimately synthesized speech sound like a whisper based on the input speech being whispered).

The output of the TTS front end 716, which may be referred to as a symbolic linguistic representation, may include a sequence of phonetic units annotated with prosodic characteristics. This symbolic linguistic representation may be sent to the speech synthesis engine 718, which may also be known as a synthesizer, for conversion into an audio waveform of speech for output to an audio output device and eventually to a user. The speech synthesis engine 718 may be configured to convert the input text into high-quality natural-sounding speech in an efficient manner. Such high-quality speech may be configured to sound as much like a human speaker as possible, or may be configured to be understandable to a listener without attempts to mimic a precise human voice.

The speech synthesis engine 718 may perform speech synthesis using one or more different methods. In one method of synthesis called unit selection, described further below, a unit selection engine 730 matches the symbolic linguistic representation created by the TTS front end 716 against a database of recorded speech, such as a database (e.g., TTS unit storage 772) storing information regarding one or more voice corpuses (e.g., voice inventories 778*a-n*). Each voice inventory may correspond to various segments of audio that was recorded by a speaking human, such as a voice actor, where the segments are stored in an individual inventory 778 as acoustic units (e.g., phonemes, diphones, etc.). Each stored unit of audio may also be associated with an index listing various acoustic properties or other descriptive information about the unit. Each unit includes an audio waveform corresponding with a phonetic unit, such as a short .wav file of the specific sound, along with a description of various features associated with the audio waveform. For example, an index entry for a particular unit may include information such as a particular unit's pitch, energy, duration, harmonics, center frequency, where the phonetic unit appears in a word, sentence, or phrase, the neighboring phonetic units, or the like. The unit selection engine 730 may then use the information about each unit to select units to be joined together to form the speech output.

The unit selection engine 730 matches the symbolic linguistic representation against information about the spoken audio units in the database. The unit database may include multiple examples of phonetic units to provide the system with many different options for concatenating units into speech. Matching units which are determined to have the desired acoustic qualities to create the desired output audio are selected and concatenated together (for example by a synthesis component 720) to form output audio data 790 representing synthesized speech. Using all the information in the unit database, a unit selection engine 730 may match units to the input text to select units that can form a natural sounding waveform. One benefit of unit selection is that, depending on the size of the database, a natural sounding speech output may be generated. As described above, the larger the unit database of the voice corpus, the more likely the system will be able to construct natural sounding speech.

In another method of synthesis—called parametric synthesis—parameters such as frequency, volume, noise, are varied by a parametric synthesis engine 732, digital signal processor or other audio generation device to create an artificial speech waveform output. Parametric synthesis uses a computerized voice generator, sometimes called a vocoder. Parametric synthesis may use an acoustic model and various statistical techniques to match a symbolic linguistic representation with desired output speech parameters. Using parametric synthesis, a computing system (for example, a synthesis component 720) can generate audio waveforms having the desired acoustic properties. Parametric synthesis may include the ability to be accurate at high processing speeds, as well as the ability to process speech without large databases associated with unit selection, but also may produce an output speech quality that may not match that of unit selection. Unit selection and parametric techniques may be performed individually or combined together and/or combined with other synthesis techniques to produce speech audio output.

The TTS component 180 may be configured to perform TTS processing in multiple languages. For each language, the TTS component 180 may include specially configured data, instructions and/or components to synthesize speech in the desired language(s). To improve performance, the TTS component 180 may revise/update the contents of the TTS parametric storage 780 based on feedback of the results of TTS processing, thus enabling the TTS component 180 to improve speech recognition.

The TTS parametric storage component 780 may be customized for an individual user based on his/her individualized desired speech output. In particular, the speech unit stored in a unit database may be taken from input audio data of the user speaking. For example, to create the customized speech output of the system, the system may be configured with multiple voice inventories 778a-778n, where each unit database is configured with a different "voice" to match desired speech qualities. Such voice inventories may also be linked to user accounts. The voice may be selected by the TTS component 180 to synthesize the speech. For example, one voice corpus may be stored to be used to synthesize whispered speech (or speech approximating whispered speech), another may be stored to be used to synthesize excited speech (or speech approximating excited speech), and so on. To create the different voice corpuses a multitude of TTS training utterances may be spoken by an individual (such as a voice actor) and recorded by the system. The audio associated with the TTS training utterances may then be split into small audio segments and stored as part of a voice corpus. The individual speaking the TTS training utterances may speak in different voice qualities to create the customized voice corpuses, for example the individual may whisper the training utterances, say them in an excited voice, and so on. Thus the audio of each customized voice corpus may match the respective desired speech quality. The customized voice inventory 778 may then be used during runtime to perform unit selection to synthesize speech having a speech quality corresponding to the input speech quality.

Additionally, parametric synthesis may be used to synthesize speech with the desired speech quality. For parametric synthesis, parametric features may be configured that match the desired speech quality. If simulated excited speech was desired, parametric features may indicate an increased speech rate and/or pitch for the resulting speech. Many other examples are possible. The desired parametric features for particular speech qualities may be stored in a "voice" profile (e.g., parametric settings 768) and used for speech synthesis when the specific speech quality is desired. Customized voices may be created based on multiple desired speech qualities combined (for either unit selection or parametric synthesis). For example, one voice may be "shouted" while another voice may be "shouted and emphasized." Many such combinations are possible.

In some embodiments, the TTS component 180 may select the voice inventory 778 and/or the parametric setting 768, to generate the synthesized speech, based on a voice profile associated with the content data 402 or indicated by the content system(s) 305.

Unit selection speech synthesis may be performed as follows. Unit selection includes a two-step process. First a unit selection engine 730 determines what speech units to use and then it combines them so that the particular combined units match the desired phonemes and acoustic features and create the desired speech output. Units may be selected based on a cost function which represents how well particular units fit the speech segments to be synthesized. The cost function may represent a combination of different costs representing different aspects of how well a particular speech unit may work for a particular speech segment. For example, a target cost indicates how well an individual given speech unit matches the features of a desired speech output (e.g., pitch, prosody, etc.). A join cost represents how well a particular speech unit matches an adjacent speech unit (e.g., a speech unit appearing directly before or directly after the particular speech unit) for purposes of concatenating the speech units together in the eventual synthesized speech. The overall cost function is a combination of target cost, join cost, and other costs that may be determined by the unit selection engine 730. As part of unit selection, the unit selection engine 730 chooses the speech unit with the lowest overall combined cost. For example, a speech unit with a very low target cost may not necessarily be selected if its join cost is high.

The system may be configured with one or more voice corpuses for unit selection. Each voice corpus may include a speech unit database. The speech unit database may be stored in TTS unit storage 772 or in another storage component. For example, different unit selection databases may be stored in TTS unit storage 772. Each speech unit database (e.g., voice inventory) includes recorded speech utterances with the utterances' corresponding text aligned to the utterances. A speech unit database may include many hours of recorded speech (in the form of audio waveforms, feature vectors, or other formats), which may occupy a significant amount of storage. The unit samples in the speech unit database may be classified in a variety of ways including by phonetic unit (phoneme, diphone, word, etc.), linguistic prosodic label, acoustic feature sequence, speaker identity, etc. The sample utterances may be used to create mathematical models corresponding to desired audio output for particular speech units. When matching a symbolic linguistic representation the speech synthesis engine 718 may attempt to select a unit in the speech unit database that most closely matches the input text (including both phonetic units and prosodic annotations). Generally the larger the voice corpus/ speech unit database the better the speech synthesis may be achieved by virtue of the greater number of unit samples that may be selected to form the precise desired speech output.

Vocoder-based parametric speech synthesis may be performed as follows. A TTS component 180 may include an acoustic model, or other models, which may convert a symbolic linguistic representation into a synthetic acoustic waveform of the text input based on audio signal manipulation. The acoustic model includes rules which may be used by the parametric synthesis engine 732 to assign specific audio waveform parameters to input phonetic units and/or prosodic annotations. The rules may be used to calculate a score representing a likelihood that a particular audio output parameter(s) (such as frequency, volume, etc.) corresponds to the portion of the input symbolic linguistic representation from the TTS front end 716.

The parametric synthesis engine 732 may use a number of techniques to match speech to be synthesized with input phonetic units and/or prosodic annotations. One common technique is using Hidden Markov Models (HMMs). HMMs may be used to determine probabilities that audio output should match textual input. HMMs may be used to translate from parameters from the linguistic and acoustic space to the parameters to be used by a vocoder (the digital voice encoder) to artificially synthesize the desired speech. Using HMMs, a number of states are presented, in which the states together represent one or more potential acoustic parameters to be output to the vocoder and each state is associated with a model, such as a Gaussian mixture model. Transitions between states may also have an associated probability, representing a likelihood that a current state may be reached from a previous state. Sounds to be output may be represented as paths between states of the HMM and multiple paths may represent multiple possible audio matches for the same input text. Each portion of text may be represented by multiple potential states corresponding to different known pronunciations of phonemes and their parts (such as the phoneme identity, stress, accent, position, etc.). An initial determination of a probability of a potential phoneme may be associated with one state. As new text is processed by the speech synthesis engine 718, the state may change or stay the same, based on the processing of the new text. For example, the pronunciation of a previously processed word might change based on later processed words. A Viterbi algorithm may be used to find the most likely sequence of states based on the processed text. The HMMs may generate speech in parameterized form including parameters such as fundamental frequency (f0), noise envelope, spectral envelope, etc. that are translated by a vocoder into audio segments. The output parameters may be configured for particular vocoders such as a STRAIGHT vocoder, TANDEM-STRAIGHT vocoder, WORLD vocoder, HNM (harmonic plus noise) based vocoders, CELP (code-excited linear prediction) vocoders, GlottHMM vocoders, HSM (harmonic/stochastic model) vocoders, or others.

In addition to calculating potential states for one audio waveform as a potential match to a phonetic unit, the parametric synthesis engine 732 may also calculate potential states for other potential audio outputs (such as various ways of pronouncing a particular phoneme or diphone) as potential acoustic matches for the acoustic unit. In this manner multiple states and state transition probabilities may be calculated.

The probable states and probable state transitions calculated by the parametric synthesis engine 732 may lead to a number of potential audio output sequences. Based on the acoustic model and other potential models, the potential audio output sequences may be scored according to a confidence level of the parametric synthesis engine 732. The highest scoring audio output sequence, including a stream of parameters to be synthesized, may be chosen and digital signal processing may be performed by a vocoder or similar component to create an audio output including synthesized speech waveforms corresponding to the parameters of the highest scoring audio output sequence and, if the proper sequence was selected, also corresponding to the input text. The different parametric settings 768, which may represent acoustic settings matching a particular parametric "voice", may be used by the synthesis component 720 to ultimately create the output audio data 790.

When performing unit selection, after a unit is selected by the unit selection engine 730, the audio data corresponding to the unit may be passed to the synthesis component 720. The synthesis component 720 may then process the audio data of the unit to create modified audio data where the modified audio data reflects a desired audio quality. The synthesis component 720 may store a variety of operations that can convert unit audio data into modified audio data where different operations may be performed based on the desired audio effect (e.g., whispering, shouting, etc.).

As an example, input text may be received along with metadata, such as SSML tags, indicating that a selected portion of the input text should be whispered when output by the TTS component 180. For each unit that corresponds to the selected portion, the synthesis component 720 may process the audio data for that unit to create a modified unit audio data. The modified unit audio data may then be concatenated to form the output audio data 790. The modified unit audio data may also be concatenated with non-modified audio data depending on when the desired whispered speech starts and/or ends. While the modified audio data may be sufficient to imbue the output audio data with the desired audio qualities, other factors may also impact the ultimate output of audio such as playback speed, background effects, or the like, that may be outside the control of the TTS component 180. In that case, other output data 785 may be output along with the output audio data 790 so that an ultimate playback device (e.g., device 110) receives instructions for playback that can assist in creating the desired output audio. Thus, the other output data 785 may include instructions or other data indicating playback device settings (such as volume, playback rate, etc.) or other data indicating how output audio data including synthesized speech should be output. For example, for whispered speech, the output audio data 790 may include other output data 785 that may include a prosody tag or other indicator that instructs the device 110 to slow down the playback of the output audio data 790, thus making the ultimate audio sound more like whispered speech, which is typically slower than normal speech. In another example, the other output data 785 may include a volume tag that instructs the device 110 to output the speech at a volume level less than a current volume setting of the device 110, thus improving the quiet whisper effect.

Figure 7B:
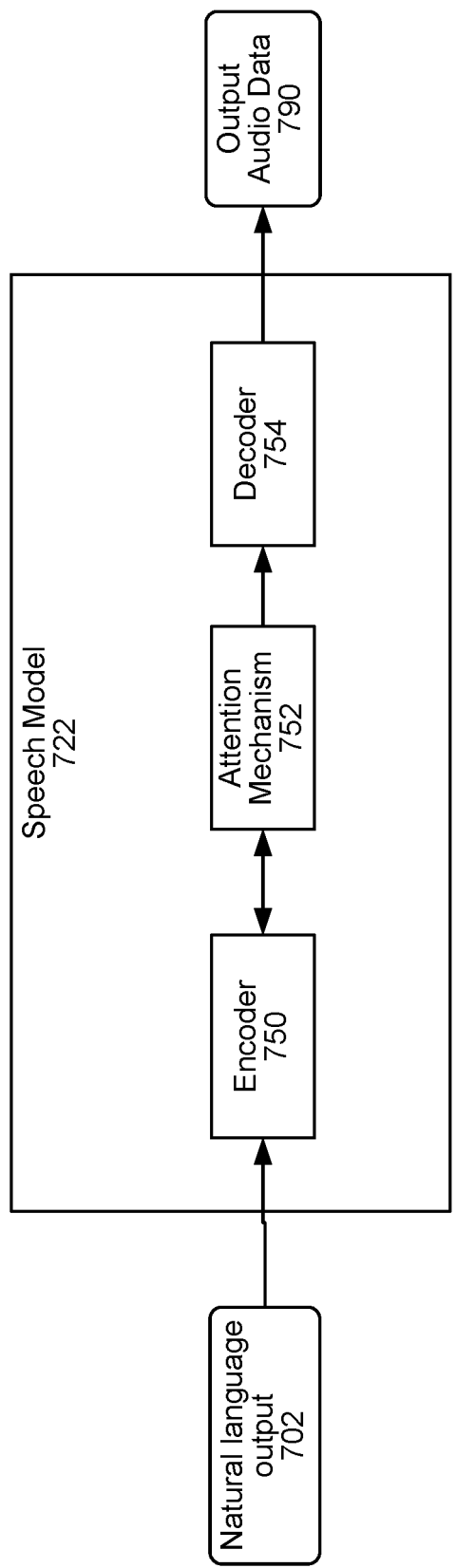
FIG. 7B is a conceptual diagram of a speech model, according to embodiments of the present disclosure.

FIG. 7B illustrates an embodiment of the speech model 722. The speech model may include an encoder 750, attention mechanism 752, and a decoder 754. This arrangement of components may be referred to as a sequence-to-sequence model. The encoder 750 and/or decoder 754 may be neural networks having one or more layers. These layers may consist of one or more nodes; each node may receive input data or the output of a node from a previous layer and process that data in accordance with one or more model weights. For example, a node may multiply a value of an input with a model weight to produce an output. The neural networks may be deep neural networks (DNNs), convolutional neural networks (CNNs), and/or recurrent neural networks (RNNs). The neural networks may be trained using training data, such as recordings of utterances and corresponding text.

The encoder 750 may receive the natural language output 702. The encoder 750 may encode this information into a context vector, which is input to the decoder 754. Optionally, an attention mechanism 752 may receive this context vector as well as outputs of other nodes of the encoder 750 and weight (e.g., "attend") different outputs of the encoder 750 differently. The decoder 754 may then generate output audio data 790 (which may include the response data) using the context vector and/or output of the attention mechanism 752.

Figure 8:
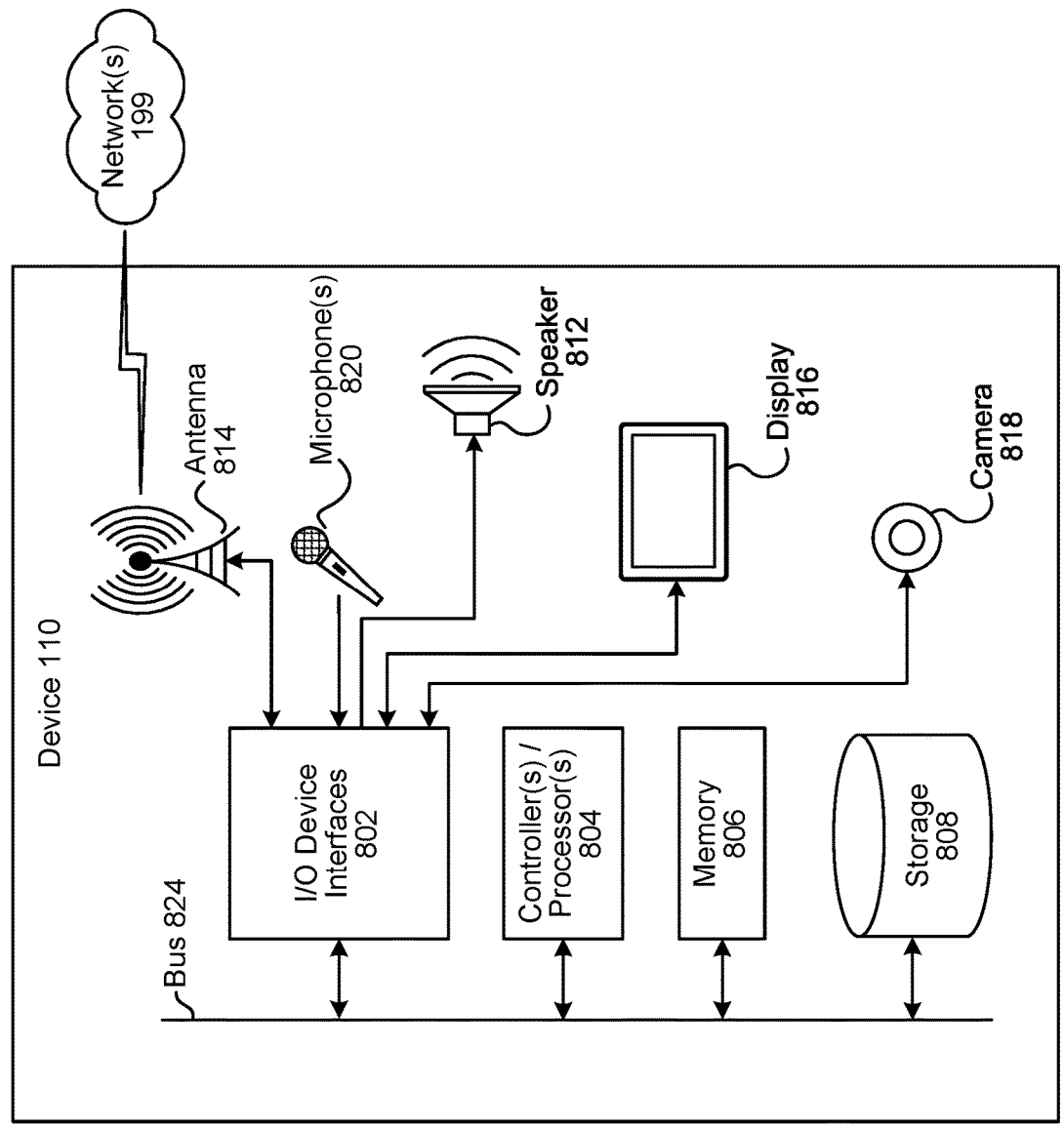
FIG. 8 is a block diagram conceptually illustrating example components of a device, according to embodiments of the present disclosure.
Figure 9:
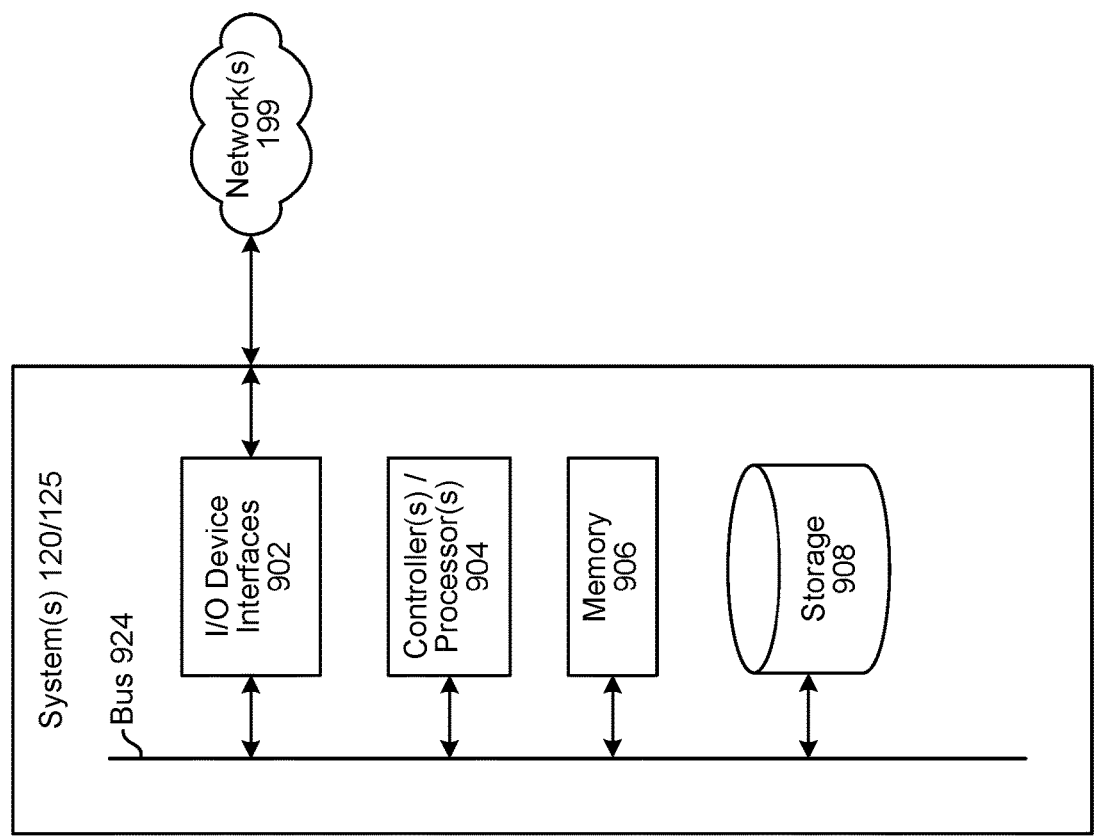
FIG. 9 is a block diagram conceptually illustrating example components of a system, according to embodiments of the present disclosure.

FIG. 8 is a block diagram conceptually illustrating a device 110 of the system 100. FIG. 9 is a block diagram conceptually illustrating example components of a remote device, such as the system 120 and the skill(s) system 125. A system (120/125) may include one or more servers. A "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The system (120/125) may be configured to operate using one or more of a client-server model, a computer bureau model, grid computing techniques, fog computing techniques, mainframe techniques, utility computing techniques, a peer-to-peer model, sandbox techniques, or other computing techniques.

Multiple systems (120/125) may be included in the system 100 of the present disclosure, such as, one or more systems 120 and/or one or more skills 125. In operation, each of these systems may include computer-readable and computer-executable instructions that reside on the respective device (120/125), as will be discussed further below.

Each of these devices (110/120/125) may include one or more controllers/processors (804/904), which may each include a central processing unit (CPU) for processing data and computer-readable instructions, and a memory (806/906) for storing data and instructions of the respective device. The memories (806/906) may individually include volatile random access memory (RAM), non-volatile read only memory (ROM), non-volatile magnetoresistive memory (MRAM), and/or other types of memory. Each device (110/120/125) may also include a data storage component (808/908) for storing data and controller/processor-executable instructions.

Each data storage component (808/908) may individually include one or more non-volatile storage types such as magnetic storage, optical storage, solid-state storage, etc. Each device (110/120/125) may also be connected to removable or external non-volatile memory and/or storage (such as a removable memory card, memory key drive, networked storage, etc.) through respective input/output device interfaces (802/902).

Computer instructions for operating each device (110/120/125) and its various components may be executed by the respective device's controller(s)/processor(s) (804/904), using the memory (806/906) as temporary "working" storage at runtime. A device's computer instructions may be stored in a non-transitory manner in non-volatile memory (806/906), storage (808/908), or an external device(s). Alternatively, some or all of the executable instructions may be embedded in hardware or firmware on the respective device in addition to or instead of software.

Each device (110/120/125) includes input/output device interfaces (802/902). A variety of components may be connected through the input/output device interfaces (802/902), as will be discussed further below. Additionally, each device (110/120/125) may include an address/data bus (824/924) for conveying data among components of the respective device. Each component within a device (110/120/125) may also be directly connected to other components in addition to (or instead of) being connected to other components across the bus (824/924).

Referring to FIG. 8, the device 110 may include input/output device interfaces 802 that connect to a variety of components such as an audio output component such as a speaker 812, a wired headset or a wireless headset (not illustrated), or other component capable of outputting audio. The device 110 may also include an audio capture component. The audio capture component may be, for example, a microphone 820 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The device 110 may additionally include a display 816 for displaying content. The device 110 may further include a camera 818.

Via antenna(s) 814, the input/output device interfaces 802 may connect to one or more networks 199 via a wireless local area network (WLAN) (such as Wi-Fi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interface (802/902) may also include communication components that allow data to be exchanged between devices such as different physical servers in a collection of servers or other components.

The components of the device 110, the system 120, and/or skill 125 may include their own dedicated processors, memory, and/or storage. Alternatively, one or more of the components of the device 110, the system 120, and/or skill 125 may utilize the I/O interfaces (802/902), processor(s) (804/904), memory (806/906), and/or storage (808/908) of the device 110, the system 120, and/or skill 125, respectively.

As noted above, multiple devices may be employed in a single system. In such a multi-device system, each of the devices may include different components for performing different aspects of the system's processing. The multiple devices may include overlapping components. The components of the device 110, the system 120, and the skill 125, as described herein, are illustrative, and may be located as a stand-alone device or may be included, in whole or in part, as a component of a larger device or system.

Figure 10:
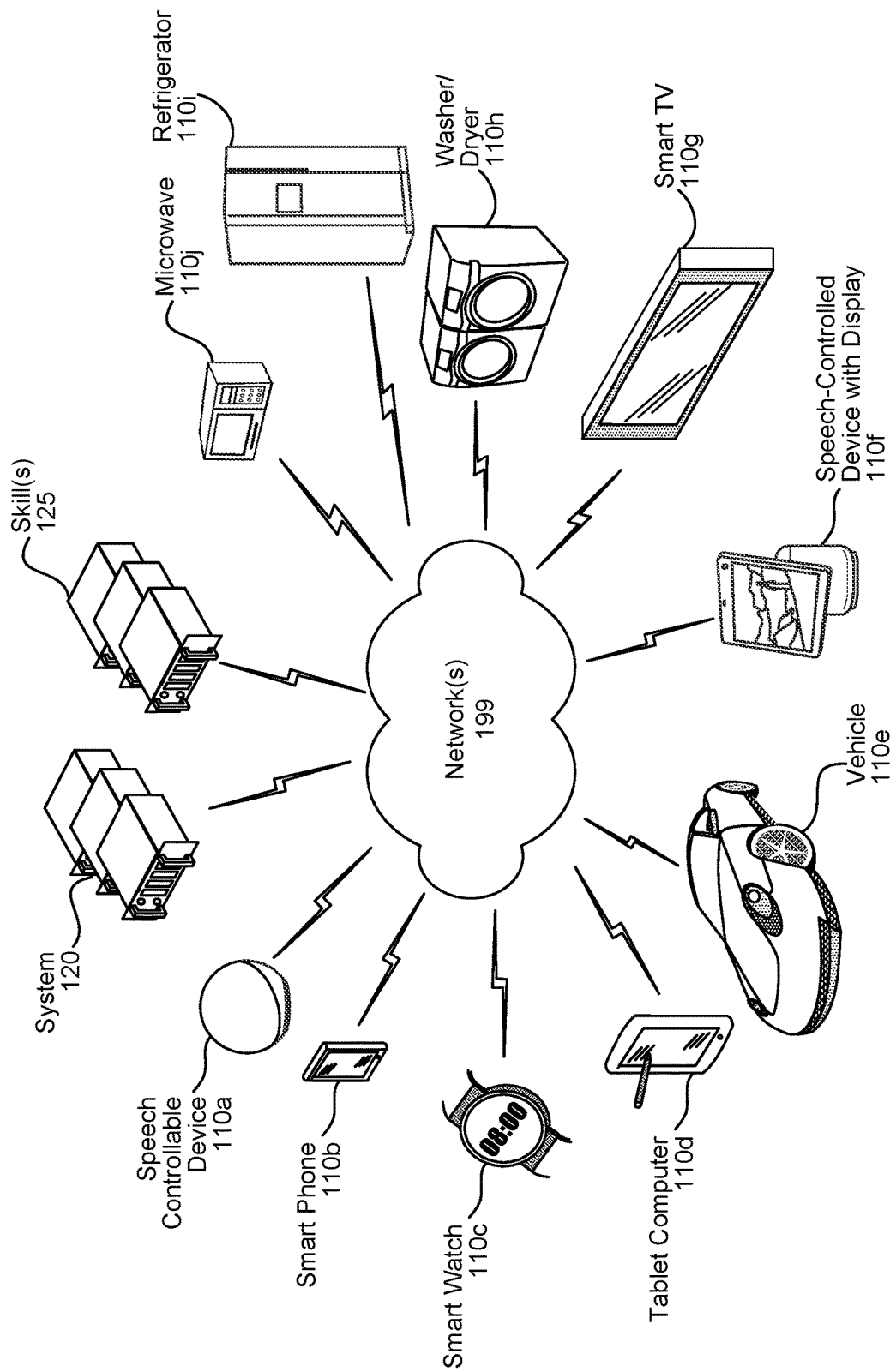
FIG. 10 illustrates an example of a computer network for use with the overall system, according to embodiments of the present disclosure.

As illustrated in FIG. 10, multiple devices (110a-110j, 120, 125) may contain components of the system and the devices may be connected over a network(s) 199. The network(s) 199 may include a local or private network or may include a wide network such as the Internet. Devices may be connected to the network(s) 199 through either wired or wireless connections. For example, a speech-controllable device 110a, a smart phone 110b, a smart watch 110c, a tablet computer 110d, a vehicle 110e, a speech-controllable display device 110f, a smart television 110g, a washer/dryer 110h, a refrigerator 110i, and/or a microwave 110j may be connected to the network(s) 199 through a wireless service provider, over a Wi-Fi or cellular network connection, or the like. Other devices are included as network-connected support devices, such as the system 120, the skill 125, and/or others. The support devices may connect to the network(s) 199 through a wired connection or wireless connection.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware, such as an acoustic front end (AFE), which comprises, among other things, analog and/or digital filters (e.g., filters configured as firmware to a digital signal processor (DSP)).

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method, comprising:
   causing a device to output first content;
   determining second content is to be output, the second content corresponding to a first item;
   generating first output data comprising:
      a first portion representing interactive content is going to be output, and
      a second portion corresponding to the second content;
   sending the first output data to the device;
   receiving, from the device, input data representing a natural language input;
   performing natural language processing on the input data to determine natural language processing results data;
   determining the natural language processing results data corresponds to the interactive content; and
   performing an action responsive to the natural language input.

2. The computer-implemented method of claim 1, wherein the second content corresponds to pre-recorded content.

3. The computer-implemented method of claim 1, further comprising:
   determining a duration of time elapsed between output of the first output data at the device and receipt of the input data;
   based on the duration of time, determining that the natural language input corresponds to the first output data; and
   sending data corresponding to the input data to an interactive content component for processing.

4. The computer-implemented method of claim 1, wherein:
   the input data comprises first audio data representing a spoken input; and
   performing natural language processing on the input data comprises:
      determining automatic speech recognition (ASR) data corresponding to the first audio data, and
      determining, using the ASR data, natural language understanding (NLU) data corresponding to the first audio data.

5. The computer-implemented method of claim 1, further comprising:
   determining context data indicating that the first output data was outputted at the device; and
   based at least in part on the context data, determining that the natural language input corresponds to the second content.

6. The computer-implemented method of claim 1, further comprising:

processing the natural language processing results data using an interactive content component to determine the action.

7. The computer-implemented method of claim 1, further comprising:
determining, using stored data associated with the second content, that a first application component is to be invoked to perform the action; and
sending, to the first application component, a first indication of the action and a second indication of the first item.

8. The computer-implemented method of claim 1, further comprising:
prior to sending the first output data, receiving, from the device, second input data requesting output of the first content;
determining second output data corresponding to the first content, the second output data including a time condition when interactive content can be output;
sending, to the device, the second output data;
after a portion of the second output data is outputted, determining that the time condition is satisfied; and
sending, to the device, the first output data in response to the time condition being satisfied.

9. The computer-implemented method of claim 1, further comprising:
determining an account identifier corresponding to the device; and
storing data associating the action and the second content to the account identifier.

10. The computer-implemented method of claim 1, further comprising:
generating the first output data to comprise a third portion representing that the action can be performed with respect to the first item.

11. A system comprising:
at least one processor; and
at least one memory comprising instructions that, when executed by the at least one processor, cause the system to:
cause a device to output first content;
determine second content is to be output, the second content corresponding to a first item;
generate first output data comprising:
a first portion representing interactive content is going to be output, and
a second portion corresponding to the second content;
send the first output data to the device;
receive, from the device, input data representing a natural language input;
perform natural language processing on the input data to determine natural language processing results data;
determine the natural language processing results data corresponds to the interactive content; and
perform an action responsive to the natural language input.

12. The system of claim 11, wherein the second content corresponds to pre-recorded content.

13. The system of claim 11, wherein the at least one memory further comprises instructions that, when executed by the at least one processor, further cause the system to:
determine a duration of time elapsed between output of the first output data at the device and receipt of the input data;
based on the duration of time, determine that the natural language input corresponds to the first output data; and
send data corresponding to the input data to an interactive content component for processing.

14. The system of claim 11, wherein:
the input data comprises first audio data representing a spoken input; and
the instructions that cause the system to natural language processing on the input data comprise instructions that, when executed by the at least one processor, cause the system to:
determine automatic speech recognition (ASR) data corresponding to the first audio data, and
determine, using the ASR data, natural language understanding (NLU) data corresponding to the first audio data.

15. The system of claim 11, wherein the at least one memory further comprises instructions that, when executed by the at least one processor, further cause the system to:
determine context data indicating that the first output data was outputted at the device; and
based at least in part on the context data, determine that the natural language input corresponds to the second content.

16. The system of claim 11, wherein the at least one memory further comprises instructions that, when executed by the at least one processor, further cause the system to:
process the natural language processing results data using an interactive content component to determine the action.

17. The system of claim 11, wherein the at least one memory further comprises instructions that, when executed by the at least one processor, further cause the system to:
determine, using stored data associated with the second content, that a first application component is to be invoked to perform the action; and
send, to the first application component, a first indication of the action and a second indication of the first item.

18. The system of claim 11, wherein the at least one memory further comprises instructions that, when executed by the at least one processor, further cause the system to:
prior to sending the first output data, receive, from the device, second input data requesting output of the first content;
determine second output data corresponding to the first content, the second output data including a time condition when interactive content can be output;
send, to the device, the second output data;
after a portion of the second output data is outputted, determine that the time condition is satisfied; and
send, to the device, the first output data in response to the time condition being satisfied.

19. The system of claim 11, wherein the at least one memory further comprises instructions that, when executed by the at least one processor, further cause the system to:
determine an account identifier corresponding to the device; and
store data associating the action and the second content to the account identifier.

20. The system of claim 11, wherein the at least one memory further comprises instructions that, when executed by the at least one processor, further cause the system to:
generate the first output data to comprise a third portion representing that the action can be performed with respect to the first item.

\* \* \* \* \*